US010814990B2

(12) United States Patent
Vassberg et al.

(10) Patent No.: US 10,814,990 B2
(45) Date of Patent: Oct. 27, 2020

(54) AIRCRAFT PROPULSION SYSTEM WITH A LOW-FAN-PRESSURE-RATIO ENGINE IN A FORWARD OVER-WING FLOW INSTALLATION, AND METHOD OF INSTALLING THE SAME

(71) Applicant: The Boeing Company, Chicago, IL (US)

(72) Inventors: John C. Vassberg, Long Beach, CA (US); Mark Dehaan, Rancho Palos Verdes, CA (US); Tony J. Sclafani, Alta Loma, CA (US)

(73) Assignee: The Boeing Company, Chicago, IL (US)

( * ) Notice: Subject to any disclaimer, the term of this patent is extended or adjusted under 35 U.S.C. 154(b) by 351 days.

(21) Appl. No.: 16/022,664

(22) Filed: Jun. 28, 2018

(65) Prior Publication Data

US 2020/0002014 A1 Jan. 2, 2020

(51) Int. Cl.
*B64D 27/12* (2006.01)
*B64C 3/28* (2006.01)
*B64D 33/04* (2006.01)
*F02K 3/06* (2006.01)

(52) U.S. Cl.
CPC ............ *B64D 27/12* (2013.01); *B64C 3/28* (2013.01); *B64D 33/04* (2013.01); *F02K 3/06* (2013.01); *F05D 2220/323* (2013.01)

(58) Field of Classification Search
CPC .......... B64D 27/10; B64D 27/12; F02K 3/04; F02K 3/06; F02K 3/068
See application file for complete search history.

(56) References Cited

U.S. PATENT DOCUMENTS

| 4,449,680 | A | * | 5/1984 | Gratzer | B64D 29/02 244/130 |
| 7,669,785 | B2 | * | 3/2010 | Shmilovich | F02K 1/06 239/265.19 |
| 2015/0125259 | A1 | * | 5/2015 | Suciu | F02C 7/36 415/1 |
| 2015/0367946 | A1 | * | 12/2015 | Boileau | B64D 29/08 244/54 |
| 2018/0354631 | A1 | * | 12/2018 | Adibhatla | F02C 3/113 |

* cited by examiner

*Primary Examiner* — Richard G Davis

(57) ABSTRACT

There is provided a propulsion system for an aircraft, the system having a low-fan-pressure-ratio engine configured to be mounted, in a forward over-wing-flow installation, to a wing of the aircraft. The engine has a core, a variable pitch fan, and a nacelle having a nacelle trailing edge with a top-most portion positioned above a wing leading edge. The engine has an L/D ratio of the nacelle in a range of from 0.6 to 1.0, and a fan-pressure-ratio in a range of from 1.10 to 1.30. The forward over-wing-flow installation enables, during all flight phases of the aircraft, a fan flow exhaust to flow behind the nacelle, and to be bifurcated by the wing leading edge, so the fan flow exhaust flows both over the wing and under the wing. During a cruise flight phase of the aircraft, the engine minimizes scrubbing drag of the fan flow exhaust to the wing.

20 Claims, 20 Drawing Sheets

```
AIRCRAFT 12
├── WING(S) 14  WING LE 15a  WING TE 15b  LENGTH 15c  FUSELAGE 18
├── LANDING GEAR ASSEMBLY(IES) 19  LENGTH 19a  WEIGHT 19b
├── FLIGHT PHASE (FP) 150  CRUISE FP 150a  TAKEOFF FP 150b  LANDING FP 150c
└── PROPULSION SYSTEM 11
    ├── LOW-FAN-PRESSURE-RATIO ENGINE(S) 10, 10a, 10b
    ├── VERY-HIGH-BYPASS-RATIO ENGINE(S) 10c   TURBOFAN ENGINE(S) 10d
    ├── FAN PRESSURE RATIO 36  BYPASS RATIO 37  L/D RATIO 38  ENGINE INLET 40
    ├── NACELLE 26  NACELLE LE 27a  NACELLE TE 27b  NACELLE DIAMETER 29  LENGTH 29a
    ├── TOP-MOST PORTION 116  POSITION 118  RAISED POSITION 118a  PARALLEL POSITION 118b  HEIGHT 118c
    ├── FORWARD OWF INSTALLATION 50  FORWARD LOCATION 52  CORE 24
    ├── FAN 42  VPF 42a  LARGE DIAMETER FAN 42b  FAN DIAMETER 48  LENGTH 48a
    ├── FAN NOZZLE 44  VARIABLE AREA FAN NOZZLE 44a  PLURALITY OF FAN BLADES 46
    └── HIGH LIFT SYSTEM (HLS) 73
        ├── MODIFIED HLS 73a  HIGH LIFT CONFIGURATION 72  CRUISE CONFIGURATION 70
        ├── HIGH LIFT DEVICES 74  ACTUATED LIFT DEVICES 74a  LE FLAPS 78  LE SLATS 80
        ├── TOTAL TRIMMED LENGTH 82  TRIMMED LE 84  TRIMMED PORTIONS 102  TRIM LOCATIONS 108
        ├── TE FLAPS 86  INBOARD TE FLAP 86a  OUTBOARD TE FLAP 86b
        ├── SIMPLE HINGE FLAP 86c  PLAIN FLAP 86d  SINGLE PART FLAP 86e
        └── SIMPLIFIED FLAP ARCHITECTURE 87  LIMITED ANGULAR MOTION 88

INLET AIR FLOW 120  FAN FLOW 122  FAN FLOW EXHAUST PLUME 126  WIDTH 128
FAN FLOW EXHAUST 124  FIRST PORTION 124a  SECOND PORTION 124b  LIFT 144  LIFT ASSIST 144a
BIFURCATED FAN FLOW 130  BIFURCATED FAN FLOW EXHAUST 130a
OVER-WING FLOW 132  OVER-WING FAN FLOW EXHAUST 132a
UNDER-WING FLOW 134  UNDER-WING FAN FLOW EXHAUST 134a
FAN FLOW EXHAUST SCRUBBING 136  SCRUBBED SURFACE 138  SKIN FRICTION DRAG 146
SCRUBBING DRAG 140  REDUCED SCRUBBING DRAG 140a  ACCELERATED FLOW 148
```

FIG. 4

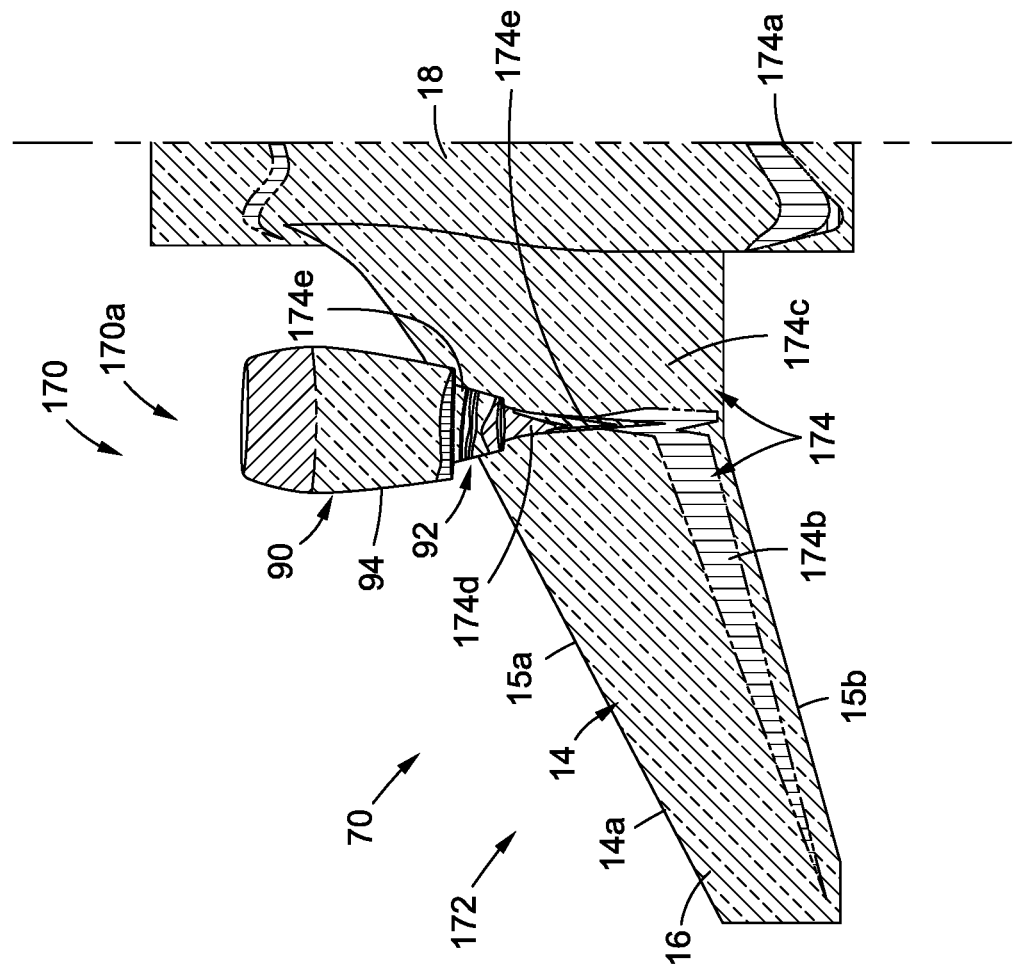
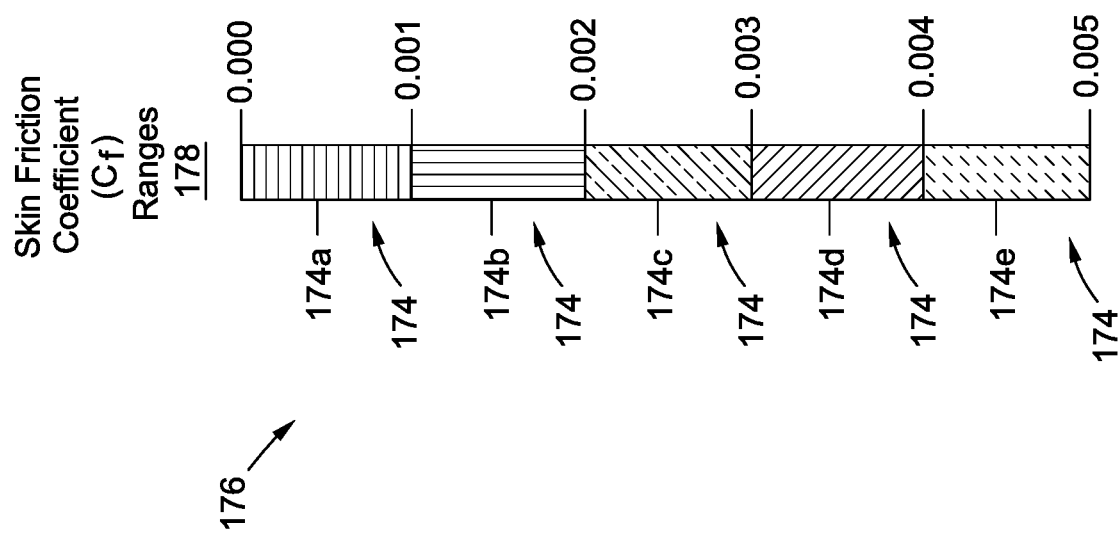
FIG. 6A

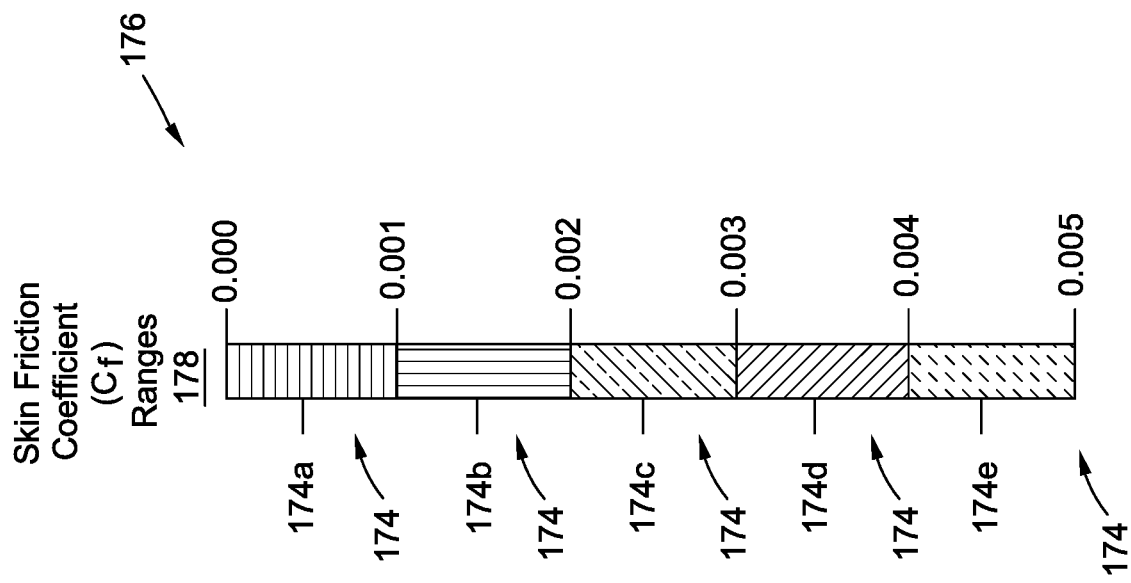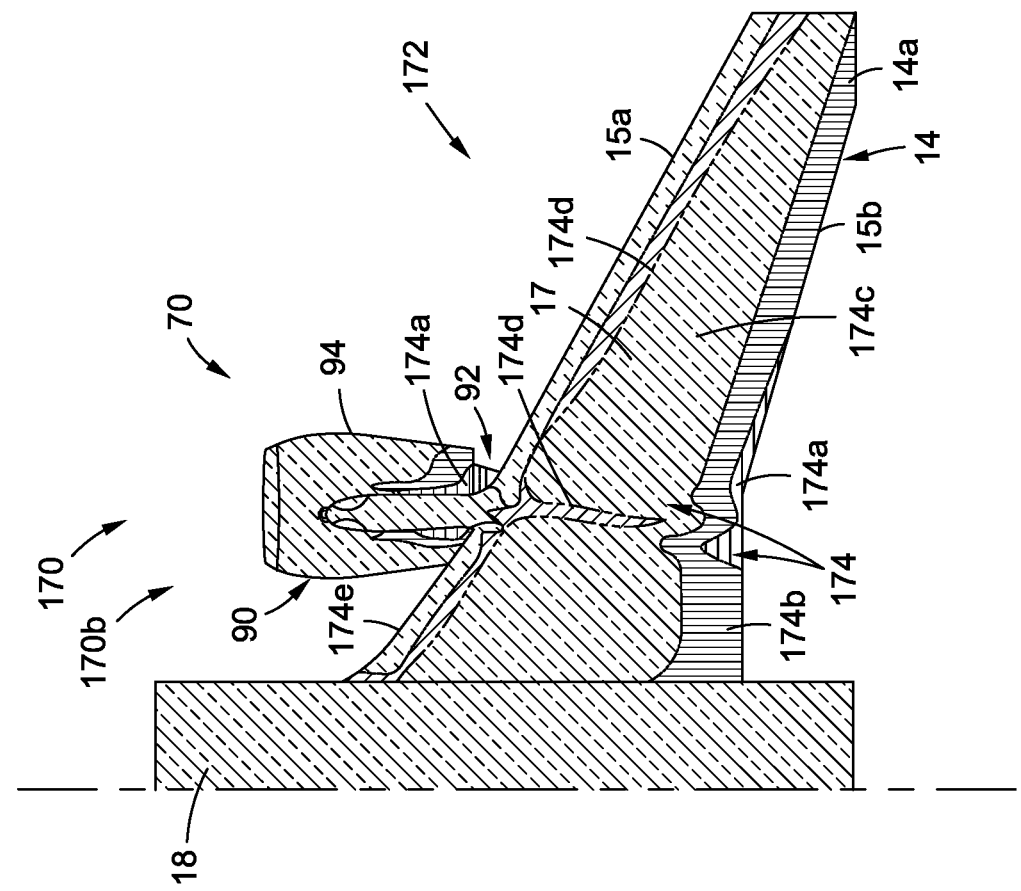
FIG. 6B

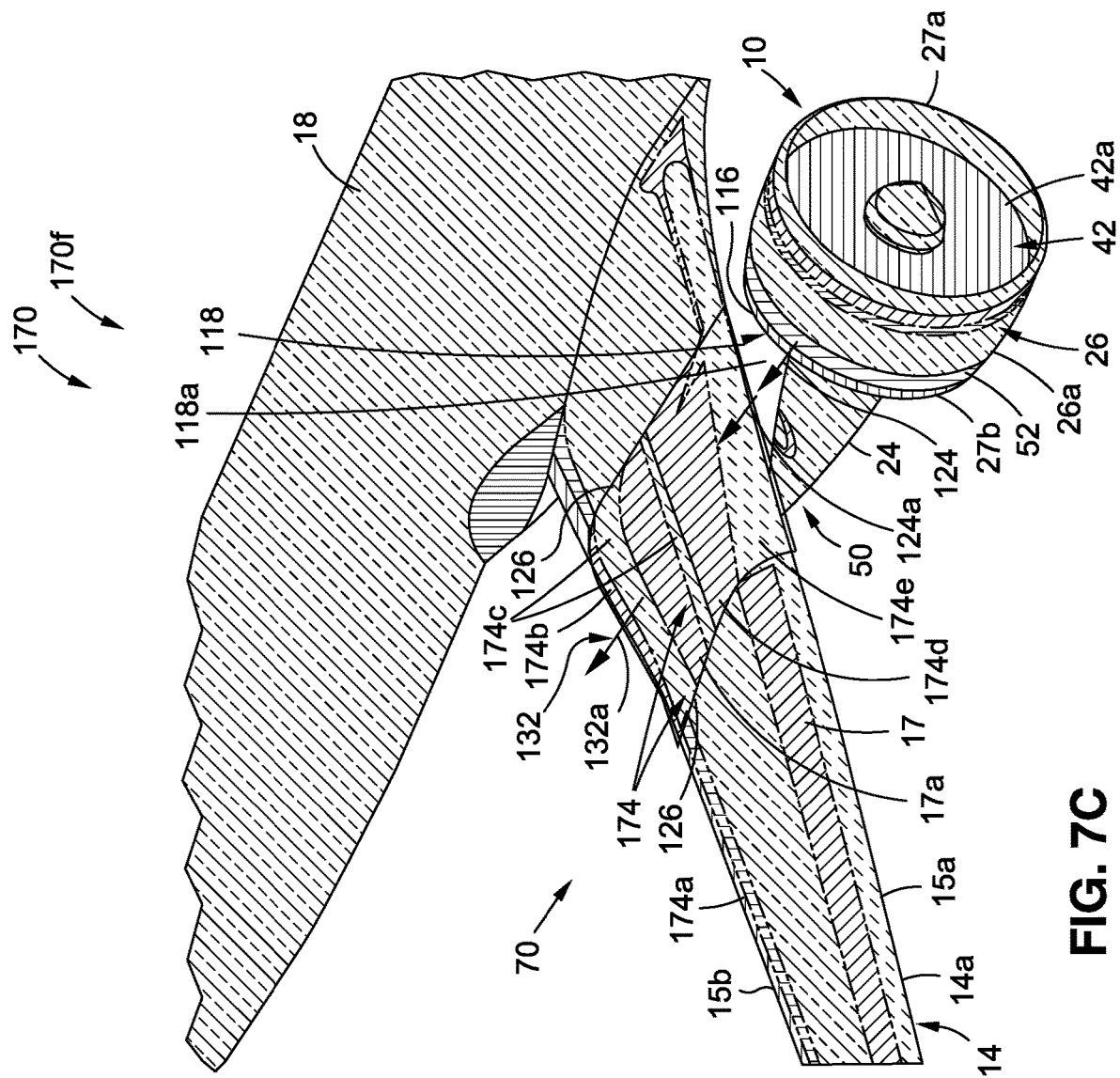
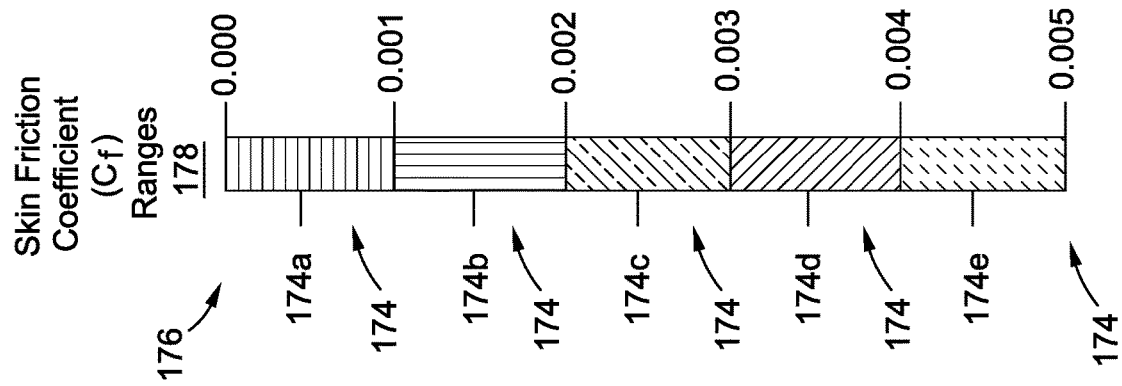
FIG. 7C

AIRCRAFT PROPULSION SYSTEM WITH A LOW-FAN-PRESSURE-RATIO ENGINE IN A FORWARD OVER-WING FLOW INSTALLATION, AND METHOD OF INSTALLING THE SAME

BACKGROUND

1) Field of the Disclosure

The disclosure relates generally to propulsion systems and methods of installing the same on an aircraft, and more particularly, to propulsion systems with low-fan-pressure-ratio engines and methods of installing the same on an aircraft.

2) Description of Related Art

Large commercial transport aircraft may be equipped with two or more turbofan engines for propulsion. These turbofan engines may typically be installed in an under-wing installation on such aircraft. In the under-wing installation, a nacelle shrouding the turbofan engine has a trailing edge positioned under a wing and positioned aft of a leading edge of the wing. In such under-wing installation, a fan flow exhaust generated by a fan of the turbofan engine is exhausted from the turbofan engine and blown under the wing of the aircraft.

In the pursuit of more efficient turbofan engines that provide increased thrust for the amount of fuel burned, low-fan-pressure-ratio engines, also referred to as very-high-bypass-ratio engines, are desirable. Such low-fan-pressure-ratio engines typically use fans and nacelles with very large diameters, for example, a fan diameter of 120 inches. However, due to their large size, it may be difficult to install such low-fan-pressure-ratio engines in an under-wing installation, as they may not be able to fit under the wing of certain existing or certain new aircraft, such as a class of aircraft that requires about 30,000 pounds of sea-level static thrust at takeoff.

Known systems and methods exist to install such low-fan-pressure-ratio engines in an under-wing installation on an aircraft. One such known system and method includes extending the length of a landing gear assembly or landing gear assemblies of the aircraft to accommodate the size of the low-fan-pressure-ratio engine for an under-wing installation. However, extending the length of the landing gear assembly or landing gear assemblies may increase the weight of the landing gear assembly or assemblies, and such increased weight may, in turn, increase the fuel burn of the aircraft during flight. Moreover, extending the length of the landing gear assembly or landing gear assemblies may require additional parts or labor, and may, in turn, increase the cost of manufacturing the aircraft. Further, extending the length of the landing gear assembly or landing gear assemblies may raise a fuselage door height an unwanted amount, such that existing jet-ways may not be able to accommodate an aircraft with a raised fuselage door height. In addition, extending the length of the landing gear assembly or landing gear assemblies may only be an available option for newly-designed aircraft and not for certain existing aircraft.

Another known system and method for installing such low-fan-pressure-ratio engines in an under-wing installation on an aircraft includes raising the position of the wings of the aircraft and mounting the wings above the fuselage. However, with such known system and method, it may be difficult to directly couple the wings to the main landing gear of the aircraft, and thus may require an additional tie-in structure to couple the wings to the main landing gear of the aircraft. Such additional tie-in structure may increase the weight of the aircraft, and may increase the complexity and cost of manufacturing the aircraft.

Accordingly, there is a need in the art for a low-fan-pressure-ratio engine having an installation solution and method of installing the low-fan-pressure-ratio engine on an aircraft that does not require changing a length or a weight of the landing gear assembly or landing gear assemblies on existing or new aircraft, that does not require an additional tie-in structure to couple the wings to the main landing gear, and that provide significant advantages over known systems and methods.

SUMMARY

Example implementations of this disclosure provide for such a low-fan-pressure-ratio engine having a forward over-wing-flow installation and method of installing the same on an aircraft. As discussed in the below detailed description, versions of the low-fan-pressure-ratio engine having a forward over-wing-flow installation and method of installing the same on an aircraft may provide significant advantages over known systems and methods.

In one version there is provided a propulsion system for an aircraft. The propulsion system comprises a low-fan-pressure-ratio engine configured to be mounted, in a forward over-wing-flow installation, to a wing of the aircraft. The low-fan-pressure-ratio engine comprises a core having a first end and a second end. The low-fan-pressure-ratio engine further comprises a variable pitch fan coupled to the first end of the core.

The low-fan-pressure-ratio engine further comprises a nacelle surrounding the variable pitch fan and a portion of the core. The nacelle has a nacelle leading edge and a nacelle trailing edge. The nacelle trailing edge has a top-most portion configured to be positioned above a wing leading edge of the wing. The nacelle is configured to be positioned, in its entirety, at a forward location in front of the wing leading edge. The low-fan-pressure-ratio engine further comprises a length to diameter (L/D) ratio of the nacelle in a range of from 0.6 to 1.0. The low-fan-pressure-ratio engine further comprises a fan-pressure-ratio in a range of from 1.10 to 1.30.

The forward over-wing-flow installation of the low-fan-pressure-ratio engine of the propulsion system enables, during all flight phases of the aircraft, a fan flow exhaust, exhausted by the variable pitch fan, to flow behind the nacelle, and to be bifurcated by the wing leading edge, so the fan flow exhaust flows both over the wing and under the wing. Further, during a cruise flight phase of the aircraft, the low-fan-pressure-ratio engine minimizes scrubbing drag of the fan flow exhaust to the wing.

In another version there is provided an aircraft. The aircraft comprises a fuselage, and at least one wing operatively coupled to the fuselage. The at least one wing has a wing leading edge and a wing trailing edge. The aircraft further comprises a propulsion system operatively coupled to the at least one wing.

The propulsion system comprises a low-fan-pressure-ratio engine coupled to the at least one wing, in a forward over-wing-flow installation. The low-fan-pressure-ratio engine comprises a core having a first end and a second end. The low-fan-pressure-ratio engine further comprises a variable pitch fan coupled to the first end of the core.

The low-fan-pressure-ratio engine further comprises a nacelle surrounding the variable pitch fan and a portion of the core. The nacelle has a nacelle leading edge and a nacelle trailing edge. The nacelle trailing edge has a top-most portion positioned above the wing leading edge. The nacelle is configured to be positioned, in its entirety, at a forward location in front of the wing leading edge. The low-fan-pressure-ratio engine further comprises a length to diameter (L/D) ratio of the nacelle in a range of from 0.6 to 1.0. The low-fan-pressure-ratio engine further comprises a fan-pressure-ratio in a range of from 1.10 to 1.30.

The forward over-wing-flow installation of the low-fan-pressure-ratio engine of the propulsion system enables, during all flight phases of the aircraft, a fan flow exhaust, exhausted by the variable pitch fan, to flow behind the nacelle, and to be bifurcated by the wing leading edge, so the fan flow exhaust flows both over the wing and under the wing. Further, during a cruise flight phase of the aircraft, the low-fan-pressure-ratio engine minimizes scrubbing drag of the fan flow exhaust to the wing.

In yet another version there is provided a method of installing a low-fan-pressure-ratio engine in a forward over-wing-flow installation on an aircraft. The method comprises providing the aircraft. The aircraft comprises a fuselage, and at least one wing operatively coupled to the fuselage. The at least one wing has a wing leading edge and a wing trailing edge.

The method further comprises installing the low-fan-pressure-ratio engine in the forward over-wing-flow installation on the aircraft. The low-fan-pressure-ratio engine comprises a core having a first end and a second end. The low-fan-pressure-ratio engine further comprises a variable pitch fan coupled to the first end of the core. The low-fan-pressure-ratio engine further comprises a nacelle surrounding the variable pitch fan and a portion of the core. The nacelle has a nacelle leading edge and a nacelle trailing edge. The low-fan-pressure-ratio engine further comprises a length to diameter (L/D) ratio of the nacelle in a range of from 0.6 to 1.0. The low-fan-pressure-ratio engine further comprises a fan-pressure-ratio in a range of from 1.10 to 1.30.

The installing of the low-fan-pressure-ratio engine in the forward over-wing-flow installation comprises positioning the nacelle, in its entirety, at a forward location in front of the wing leading edge. The installing of the low-fan-pressure-ratio engine in the forward over-wing-flow installation further comprises positioning a top-most portion of the nacelle trailing edge above the wing leading edge.

The installing of the low-fan-pressure-ratio engine in the forward over-wing-flow installation further comprises coupling the core to the at least one wing, via an engine mount structure. The installing of the low-fan-pressure-ratio engine in the forward over-wing-flow installation further comprises enabling, during all flight phases of the aircraft, a fan flow exhaust, exhausted by the variable pitch fan, to flow behind the nacelle, and to be bifurcated by the wing leading edge, so the fan flow exhaust flows both over the at least one wing and under the at least one wing.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein:

FIG. 4 is an illustration of a functional block diagram showing an aircraft having a version of a propulsion system with a low-fan-pressure-ratio engine of the disclosure;

FIGS. 6A-6C are illustrations of skin friction coefficient maps of skin friction coefficient regions on a known under-wing installation in a cruise configuration;

FIGS. 7A-7C are illustrations of skin friction coefficient maps of skin friction coefficient regions on a forward over-wing-flow installation of the disclosure in a cruise configuration;

Figure 1A:
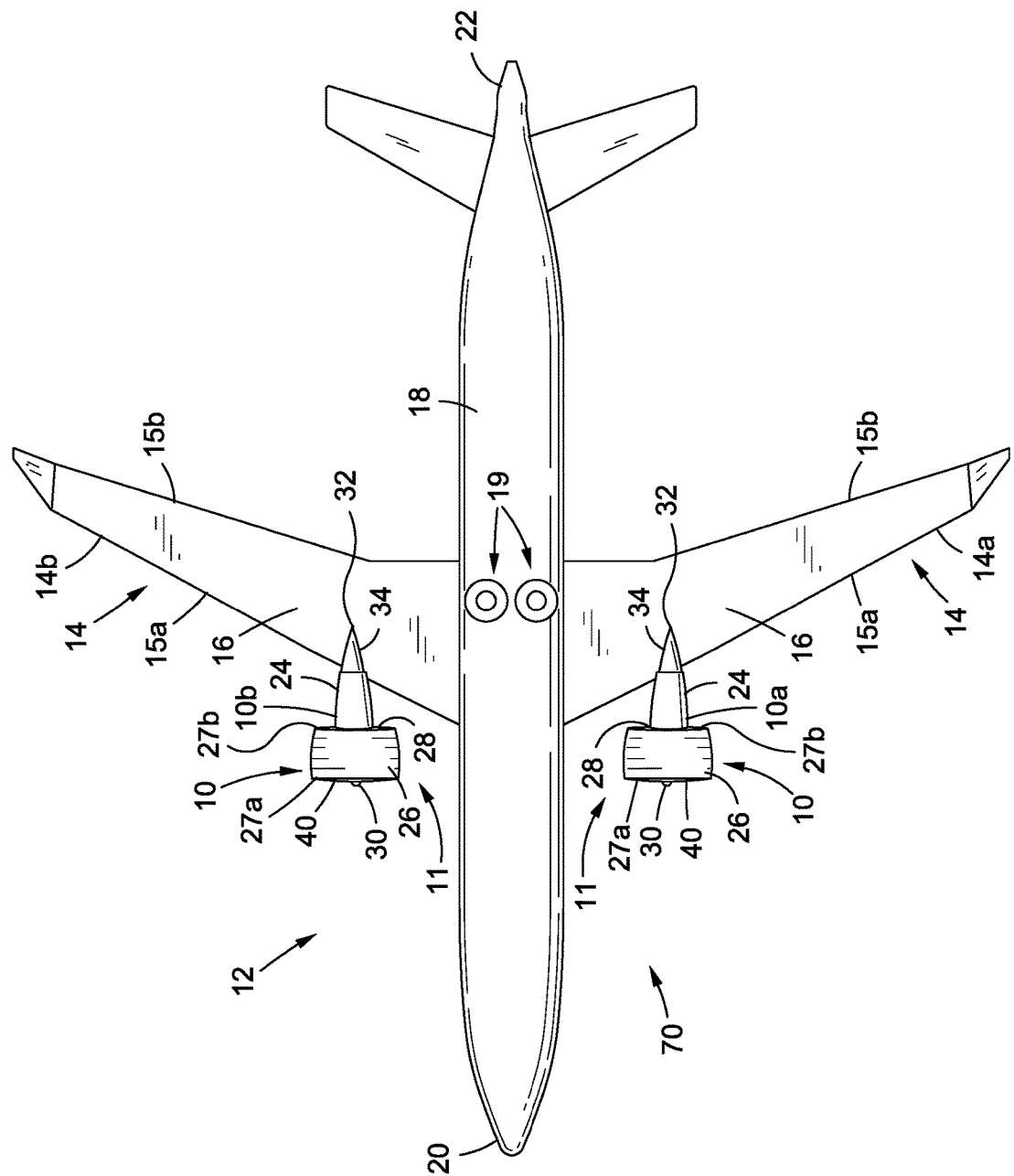
FIG. 1A is an illustration of a bottom plan view of an aircraft in a cruise configuration having a version of a low-fan-pressure-ratio engine of the disclosure.

Each figure shown in this disclosure shows a variation of an aspect of the versions or embodiments presented, and only differences will be discussed in detail.

DETAILED DESCRIPTION

Disclosed versions or embodiments will now be described more fully hereinafter with reference to the accompanying drawings, in which some, but not all of the disclosed versions or embodiments are shown. Indeed, several different versions or embodiments may be provided and should not be construed as limited to the versions or embodiments set forth herein. Rather, these versions or embodiments are provided so that this disclosure will be thorough and fully convey the scope of the disclosure to those skilled in the art.

Now referring to the Figures, and in particular, with reference to FIGS. 1A-1E and FIG. 4, in one version of the disclosure there is provided a propulsion system 11 (see FIGS. 1A, 4) for an aircraft 12 (see FIGS. 1A-1C, 1E, 4), where the propulsion system 11 comprises a low-fan-pressure-ratio engine 10 (see FIGS. 1A-1E, 4) mounted, or configured to be mounted, in a forward over-wing-flow installation 50 (see FIGS. 1C, 4), to a wing 14 (see FIGS. 1A-1C, 1E, 4) of the aircraft 12. In another version of the disclosure there is provided an aircraft 12 (see FIGS. 1A-1C, 1E, 4) having the propulsion system 11 (see FIGS. 1A, 4) comprising the low-fan-pressure-ratio engine 10 (see FIGS. 1A-1E, 4) mounted, or configured to be mounted, in the forward over-wing-flow installation 50 (see FIGS. 1C, 4), to the wing 14 (see FIGS. 1A-1C, 1E, 4) of the aircraft 12. As used herein, "forward over-wing-flow installation" means raising a turbofan engine, such as a low-fan-pressure-ratio engine, upward from a known under-wing engine installation, and installing or positioning the low-fan-pressure-ratio engine substantially in front of a wing of an aircraft, and positioning a nacelle of the low-fan-pressure-ratio engine entirely in front of a wing leading edge of the wing, so that the wing is blown with a fan flow exhaust from a fan, such as a variable pitch fan, of the low-fan-pressure-ratio engine, and the fan flow exhaust is bifurcated by the wing leading edge, so that the fan flow exhaust flows both over an upper surface of the wing and under a lower surface of the wing.

Figure 1B:
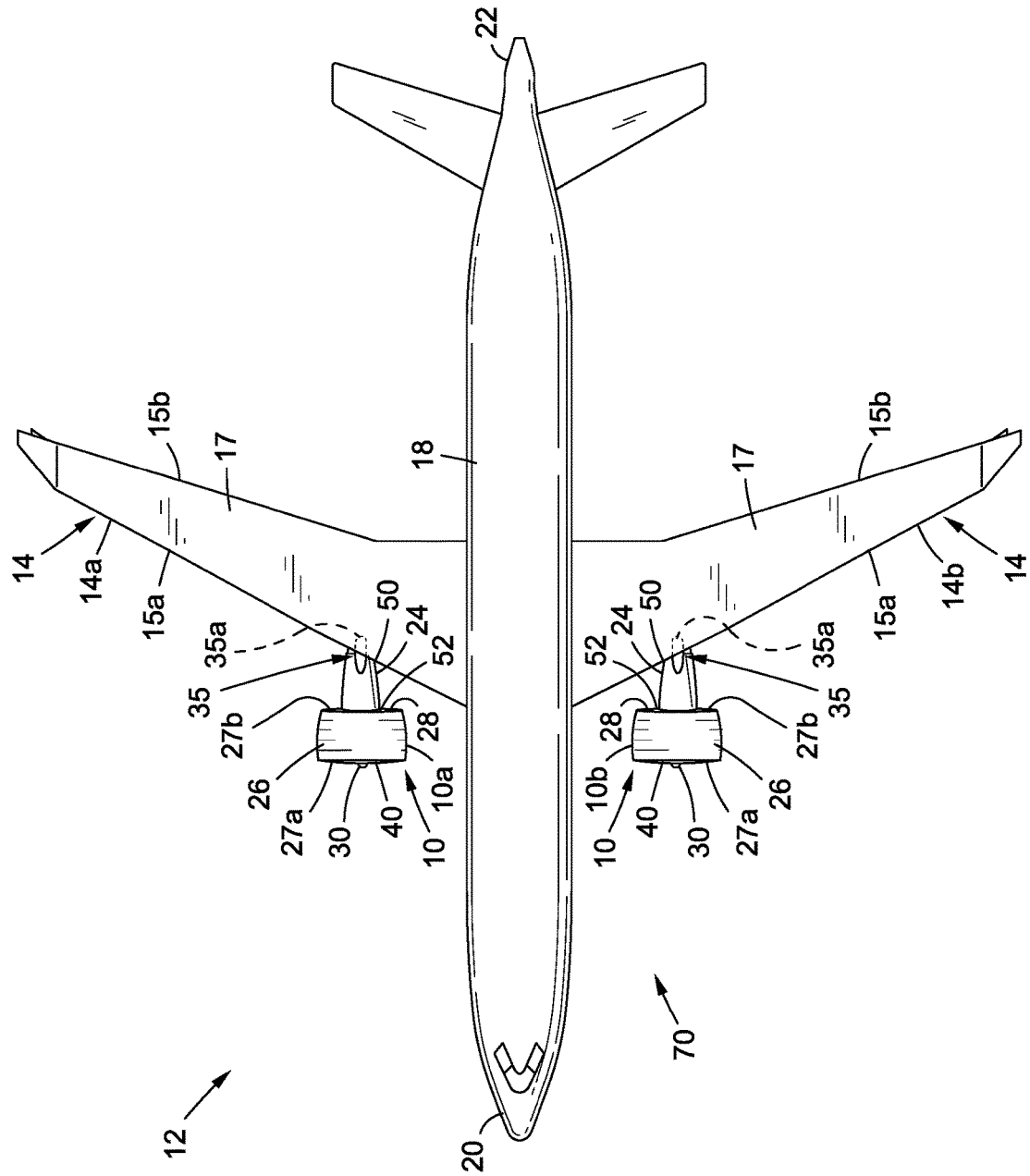
FIG. 1B is an illustration of a top plan view of the aircraft having the low-fan-pressure-ratio engine of FIG. 1A.
Figure 1C:
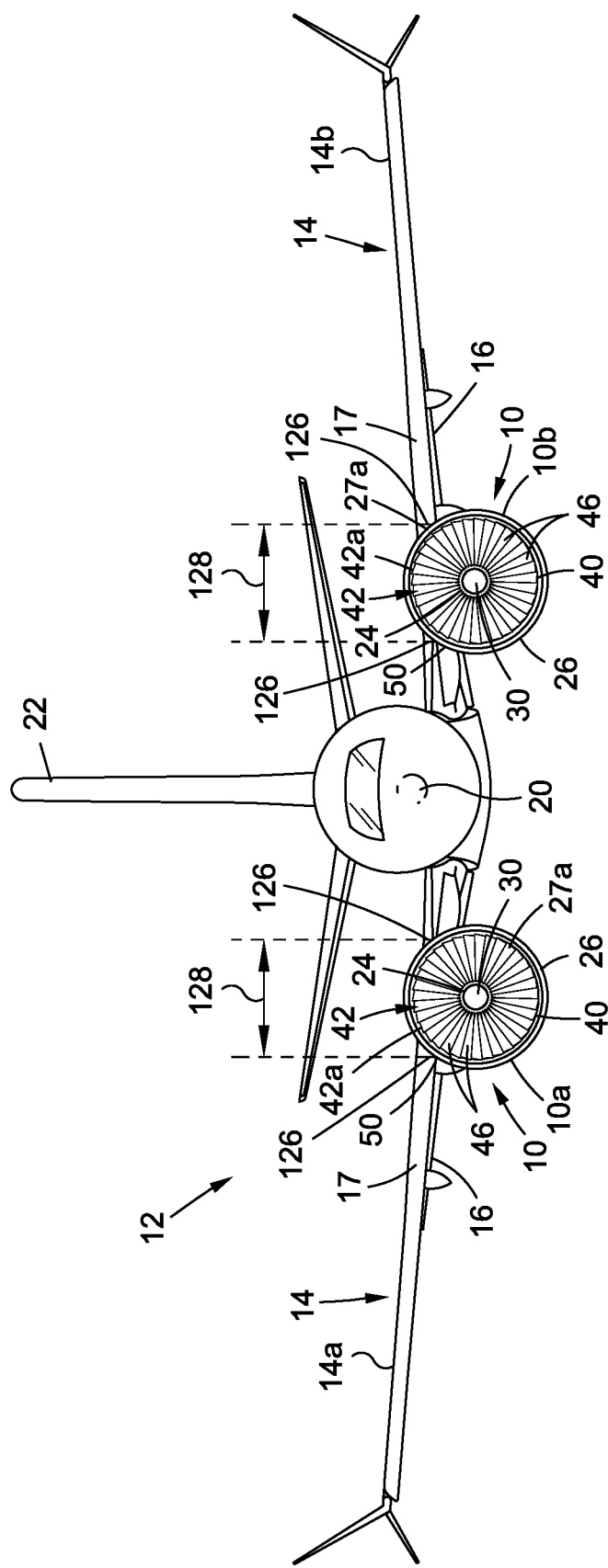
FIG. 1C is an illustration of a front view of the aircraft having the low-fan-pressure-ratio engine of FIG. 1A.
Figure 1D:
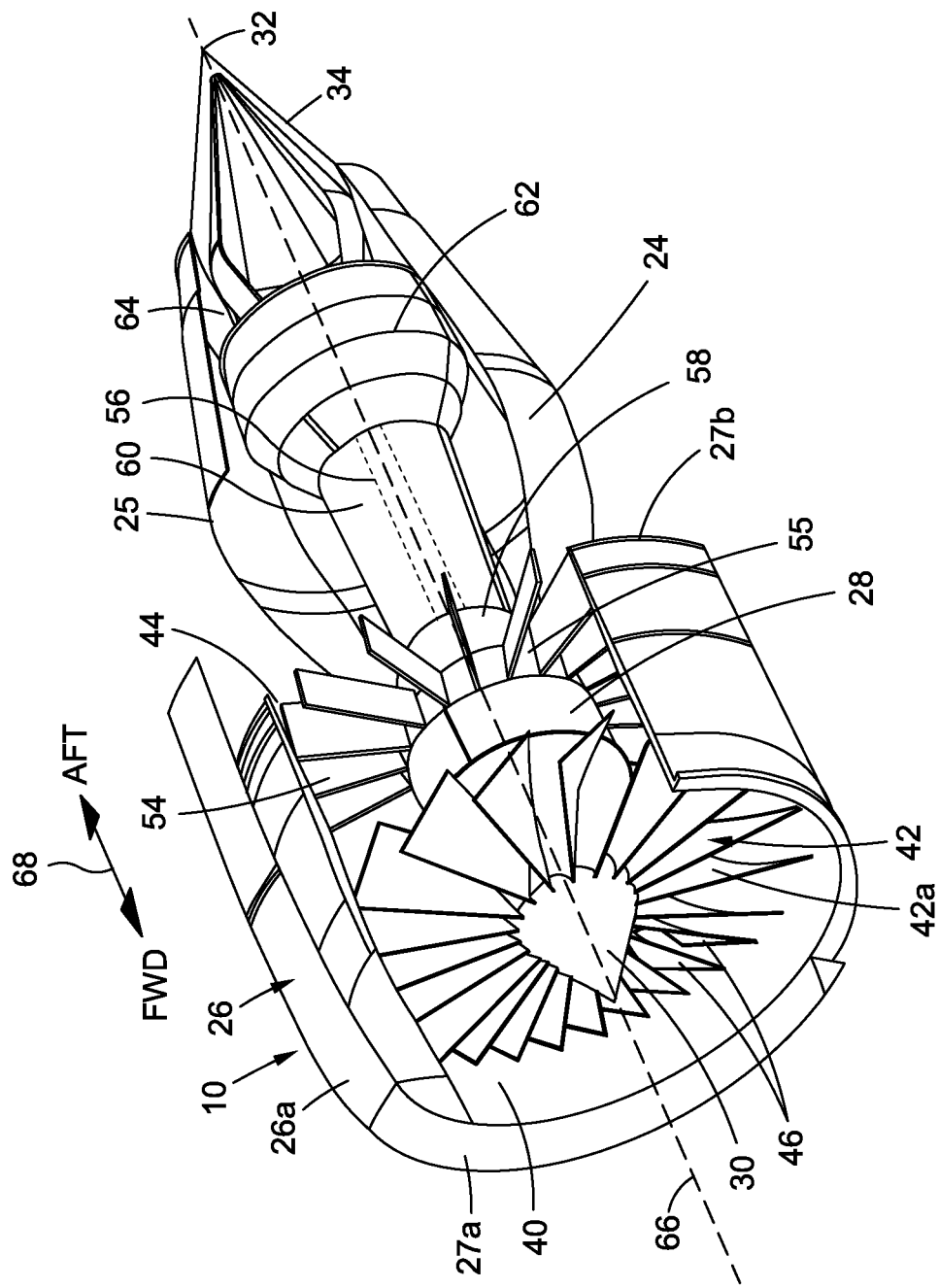
FIG. 1D is an illustration of an enlarged side perspective cutaway view of a version of a low-fan-pressure-ratio engine of the disclosure.
Figure 1E:
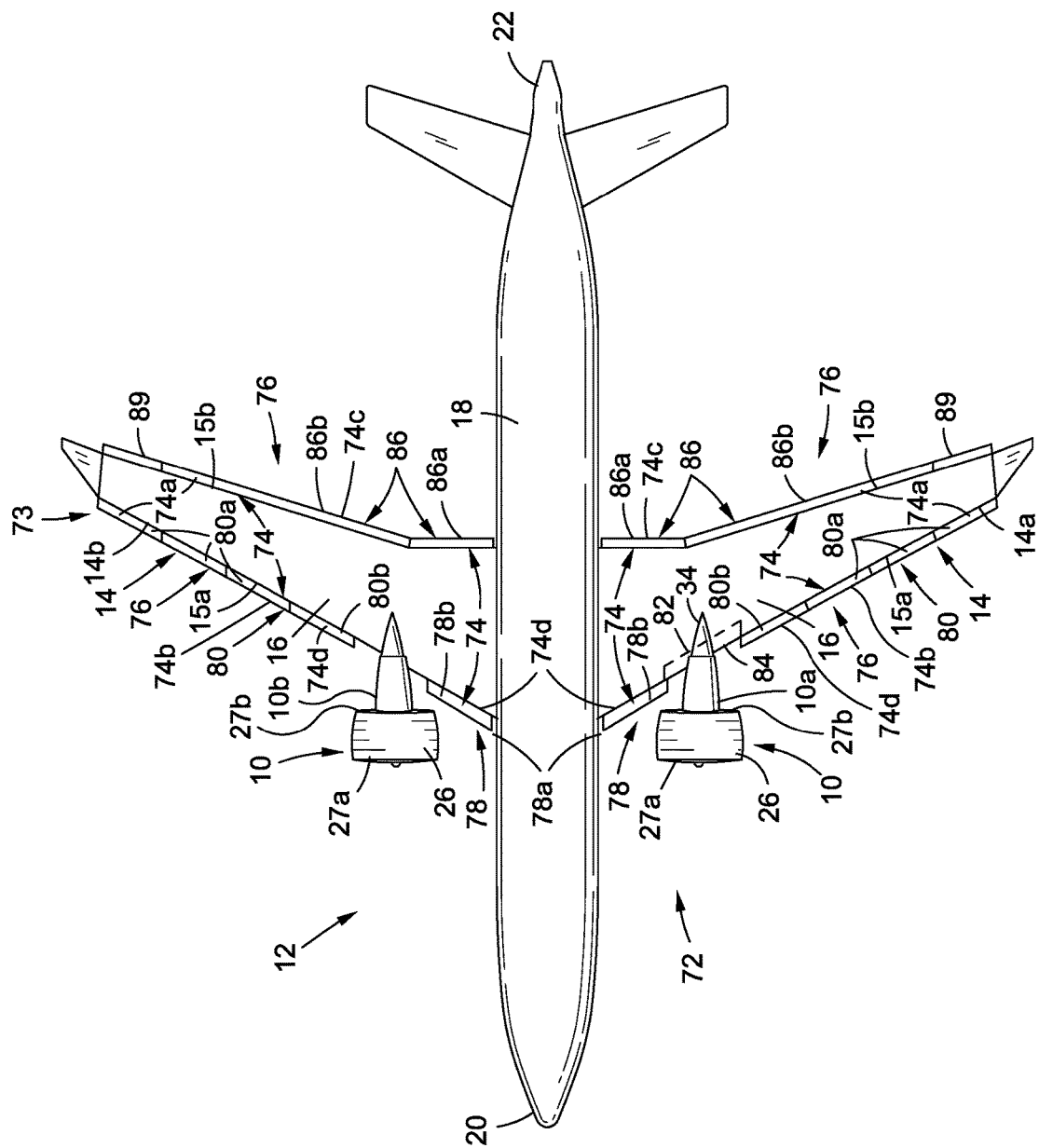
FIG. 1E is an illustration of a bottom plan view of the aircraft having the low-fan-pressure-ratio engine of FIG. 1A, in a high lift configuration, showing high lift devices in a deployed position.

FIG. 1A is an illustration of a bottom plan view of an aircraft 12 in a cruise configuration 70 having a version of the low-fan-pressure-ratio engine 10 of the disclosure. FIG. 1B is an illustration of a top plan view of the aircraft 12 having the low-fan-pressure-ratio engine 10 of FIG. 1A. FIG. 1C is an illustration of a front view of the aircraft 12 having the low-fan-pressure-ratio engine 10 of FIG. 1A. FIG. 1D is an illustration of an enlarged side perspective cutaway view of a version of a low-fan-pressure-ratio engine 10, of the disclosure. FIG. 1E is an illustration of a bottom plan view of the aircraft 12 having the low-fan-pressure-ratio engine 10 of FIG. 1A, in a high lift configuration 72, showing high lift devices 74 in a deployed position 76. FIG. 4 is an illustration of a functional block diagram showing an aircraft 12 having a version of a propulsion system 11 with a low-fan-pressure-ratio engine 10 of the disclosure.

As shown in FIGS. 1A-1C, and 1E, the aircraft 12 has two low-fan-pressure-ratio engines 10, including a first low-fan-pressure-ratio engine 10a and a second low-fan-pressure-ratio engine 10b. The low-fan-pressure-ratio engines 10 (see FIGS. 1A-1C, 1E) are preferably operatively coupled or attached to wings 14 (see FIGS. 1A-1C, 1E), such as a first wing 14a (see FIGS. 1A-1C, 1E) and a second wing 14b (see FIGS. 1A-1B, 1E). The wings 14, such as the first wing 14a and the second wing 14b, each have a wing leading edge (LE) 15a (see FIGS. 1A-1B, 1E, 4), a wing trailing edge (TE) 15b (see FIGS. 1A-1B, 1E, 4), a lower surface 16 (see FIGS. 1A, 1C, 1E), and an upper surface 17 (see FIGS. 1B, 1C).

As shown in FIG. 1A, the first low-fan-pressure-ratio engine 10a is coupled to the lower surface 16 of the first wing 14a, and the second low-fan-pressure-ratio engine 10b is coupled to the lower surface 16 of the second wing 14b. Although the low-fan-pressure-ratio engines 10 are shown coupled to the lower surface 16 of the wings 14 in FIG. 1A, the low-fan-pressure-ratio engines 10 are not limited to mounting to the lower surface 16 and may be mounted to the upper surface 17 of the wing 14, or to another suitable location on the wing 14, or on the aircraft 12.

The aircraft 12 (see FIGS. 1A-1B, 1E, 4) further has a fuselage 18 (see FIGS. 1A-1B, 1E, 4), a nose section 20 (see FIGS. 1A-1C, 1E), and a tail section 22 (see FIGS. 1A-1C, 1E). As shown in FIGS. 1A-1B, and 1E, the wings 14, such as the first wing 14a and the second wing 14b, are each operatively coupled or attached to, and extend outwardly from, the fuselage 18. The aircraft 12 is preferably a low-wing configuration aircraft, where the wings 14 are mounted and extend from the sides of the fuselage 18, and where there is less available space and distance between the wings 14 and the ground, as compared to a high-wing configuration aircraft where the wings are mounted above the fuselage and there is greater available space and distance between the wings and the ground. As shown in FIGS. 1A, 4, the aircraft 12 further has one or more landing gear assembly(ies) 19 coupled to the fuselage 18. Each landing gear assembly 19 (see FIGS. 1A, 4) has a length 19a (see FIG. 4) and a weight 19b (see FIG. 4). Installation or positioning of the low-fan-pressure-ratio engine 10 in the forward over-wing-flow installation 50 (see FIGS. 1B, 4) does not require changing the length 19a (see FIG. 4), or changing the weight 19b (see FIG. 4), of the one or more landing gear assembly(ies) 19 (see FIGS. 1A, 4) of the aircraft 12.

As shown in FIGS. 1A-1D, and 4, each low-fan-pressure-ratio engine 10 comprises a core 24. The core 24 has a first end 30 (see FIGS. 1A-1D) and a second end 32 (see FIGS. 1A, 1D), and a core structure 25 (see FIG. 1D). As shown in FIGS. 1A and 1D, the core 24 is preferably tapered at the second end 32 to form a tapered end portion 34. The tapered end portion 34 of the core 24 of the low-fan-pressure-ratio engine 10 is preferably mounted to each wing 14 (see FIG. 1B), via an engine mount structure 35 (see FIG. 1B), such as a pylon 35a (see FIG. 1B), or another suitable engine mount structure 35.

Each low-fan-pressure-ratio engine 10 (see FIGS. 1A, 2) may comprise a very-high-bypass-ratio engine 10c (see FIG. 4), also referred to as an ultra-high-bypass-ratio engine. Preferably, each low-fan-pressure-ratio engine 10 (see FIGS. 1A, 2) comprises a turbofan engine 10d (see FIG. 4).

The low-fan-pressure-ratio engine 10 (see FIGS. 1A, 2), such as in the form of the very-high-bypass-ratio engine 10c (see FIG. 4), preferably has a fan pressure ratio 36 (see FIG. 4) in a range of from 1.10 to 1.30. Other fan pressure ratios 36 outside the 1.10 to 1.30 range may also be suitable. As used herein, "fan pressure ratio" means in a turbofan engine of an aircraft, including a low-fan-pressure-ratio engine, the ratio of outer guide vane (OGV) discharge stagnation pressure to a fan inlet stagnation pressure.

The low-fan-pressure-ratio engine 10 (see FIG. 4), such as in the form of the very-high-bypass-ratio engine 10c (see FIG. 4), preferably has a bypass ratio 37 (see FIG. 4) in a range of from 15 to 50, and more preferably, has a bypass ratio 37 (see FIG. 4) in a range of from 30 to 35. Other bypass ratios 37 (see FIG. 4) outside the 15 to 50 range may also be suitable. As used herein, "bypass ratio" means in a turbofan engine, such as a low-fan-pressure-ratio engine, of an aircraft, the ratio of the amount of stream tube air flow that is bypassed around the core of the turbofan engine to the amount of air flow that passes through the core, where "stream tube air flow" means all the air flow that enters through an engine inlet or opening.

Each low-fan-pressure-ratio engine 10 (see FIGS. 1A, 4) preferably has a length to diameter (L/D) ratio 38 (see FIG. 4) of a length of a nacelle 26 (see FIGS. 1A, 1D, 4) to a nacelle diameter 29 (see FIGS. 3, 4) of the nacelle 26 of the low-fan-pressure-ratio engine 10 (see FIGS. 1A,4), in a range of from 0.6 to 1.0. Other L/D ratios 38 (see FIG. 4) outside the 0.6 to 1.0 range may also be suitable.

As shown in FIGS. 1C, 1D, and 4, the low-fan-pressure-ratio engine 10 further comprises a fan 42, such as in the form of a variable pitch fan (VPF) 42a. Each low-fan-pressure-ratio engine 10 (see FIGS. 1A, 2) preferably comprises a gas turbofan engine that achieves mechanical energy from combustion and that drives the fan 42, such as the variable pitch fan (VPF) 42a, to accelerate inlet air flow 120 (see FIG. 4) rearwards. The fan 42, such as the variable pitch fan 42a, may comprise a large diameter fan 42b (see FIG. 4) with a large frontal area, and may have a fan diameter 48 (see FIGS. 3, 4) with a length 48a (see FIG. 4) in a range of from about 80 inches to about 135 inches. This range of the fan diameter 48 is generally for a class of aircraft that requires about 30,000 pounds of sea-level static thrust at takeoff. Other fan diameters outside the 80 inches to 135 inches range may also be suitable, as used with other classes of aircraft requiring greater than 30,000 pounds of sea-level static thrust at takeoff, or less than 30,000 pounds of sea-level static thrust at takeoff.

As shown in FIGS. 1B, 1D, and FIG. 4, the fan 42, such as in the form of the variable pitch fan 42a, has a plurality of fan blades 46. Each fan blade 46 (see FIGS. 1B, 1D) extends radially outward from the core 24 (see FIGS. 1B, 1D) to the nacelle 26 (see FIGS. 1B, 1D). The fan 42 (see FIGS. 1B, 1D, 4), such as in the form of the variable pitch fan 42a (see FIGS. 1B, 1D, 2), is preferably coupled to the first end 30 (see FIGS. 1B, 1D) of the core 24. The core 24 (see FIGS. 1D, 4) of the low-fan-pressure-ratio engine 10 (see FIGS. 1D, 2) preferably generates enough power to drive the fan 42 (see FIGS. 1D, 2), such as the variable pitch fan 42a (see FIGS. 1D, 2), at its design flow and fan pressure ratio 36 (see FIG. 2). Alternatively, the low-fan-pressure-ratio engine 10 may comprise a fan 42 other than a variable pitch fan 42a, in combination with a fan nozzle 44, such as in the form of a variable area fan nozzle 44a (see FIG. 4), or another suitable variable fan mechanism.

As shown in FIGS. 1A-1E, and 4, the low-fan-pressure-ratio engine 10 further comprises a nacelle 26, surrounding the fan 42 (see FIGS. 1C, 1D), such as the variable pitch fan 42a (see FIGS. 1C, 1D), and surrounding a portion 28 (see FIGS. 1A-1B, 1D) of the core 24 (see FIGS. 1A-1B, 1D). The nacelle 26 (see FIGS. 1A-1E) may also be referred to as a fan cowl or an engine casing. The nacelle 26 has a nacelle leading edge 27a (see FIGS. 1A-1E, 4) and a nacelle trailing edge 27b (see FIGS. 1A-1B, 1D, 1E, 4). The low-fan-pressure-ratio engine 10 (see FIGS. 1A-1D, 4) has an engine inlet 40 (see FIGS. 1A-1D, 4), or opening, located at the nacelle leading edge 27a (see FIGS. 1A-1D, 4).

Figure 2:
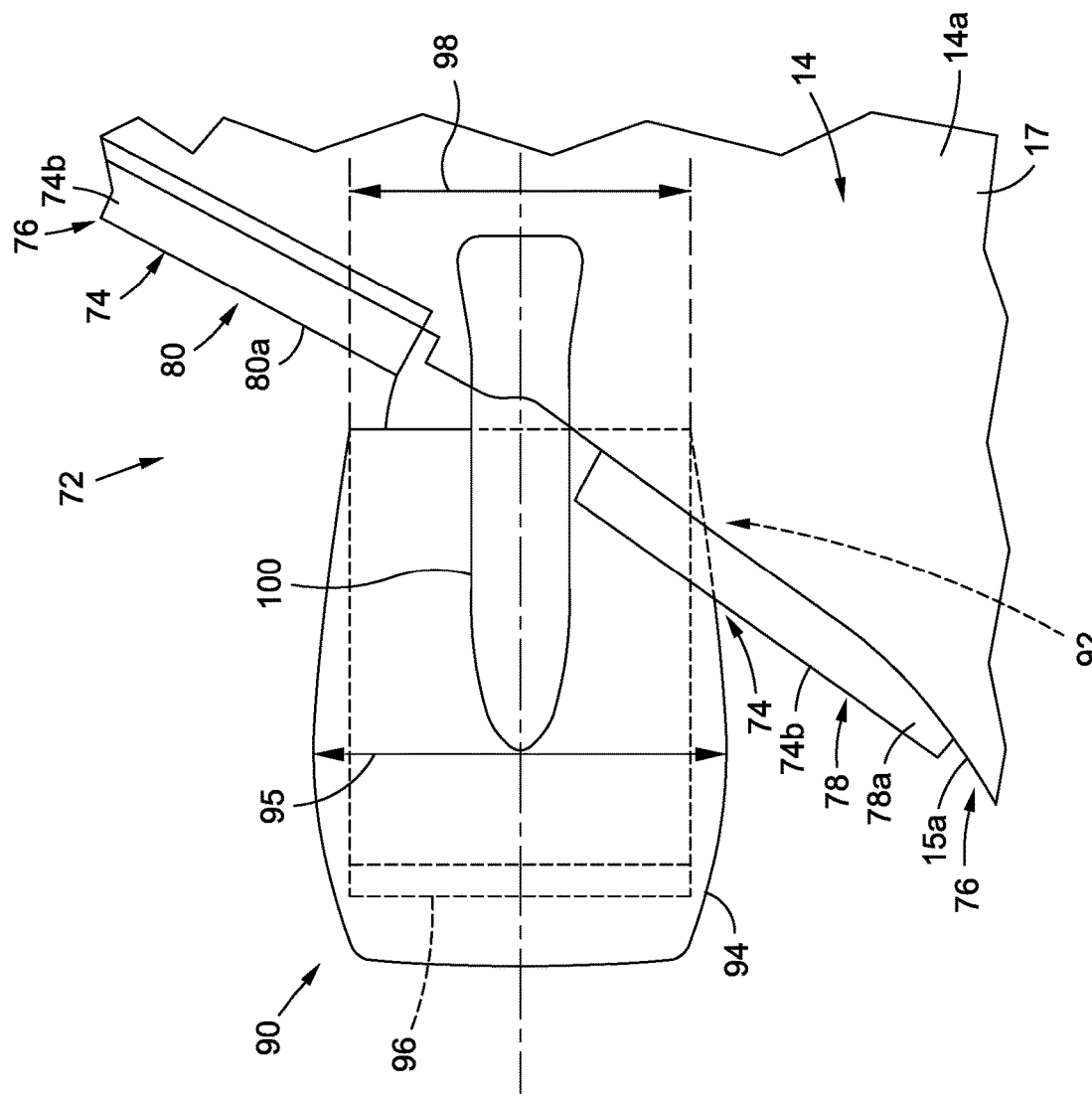
FIG. 2 is an illustration of a top plan view of a known engine in a known under-wing installation.
Figure 6C:
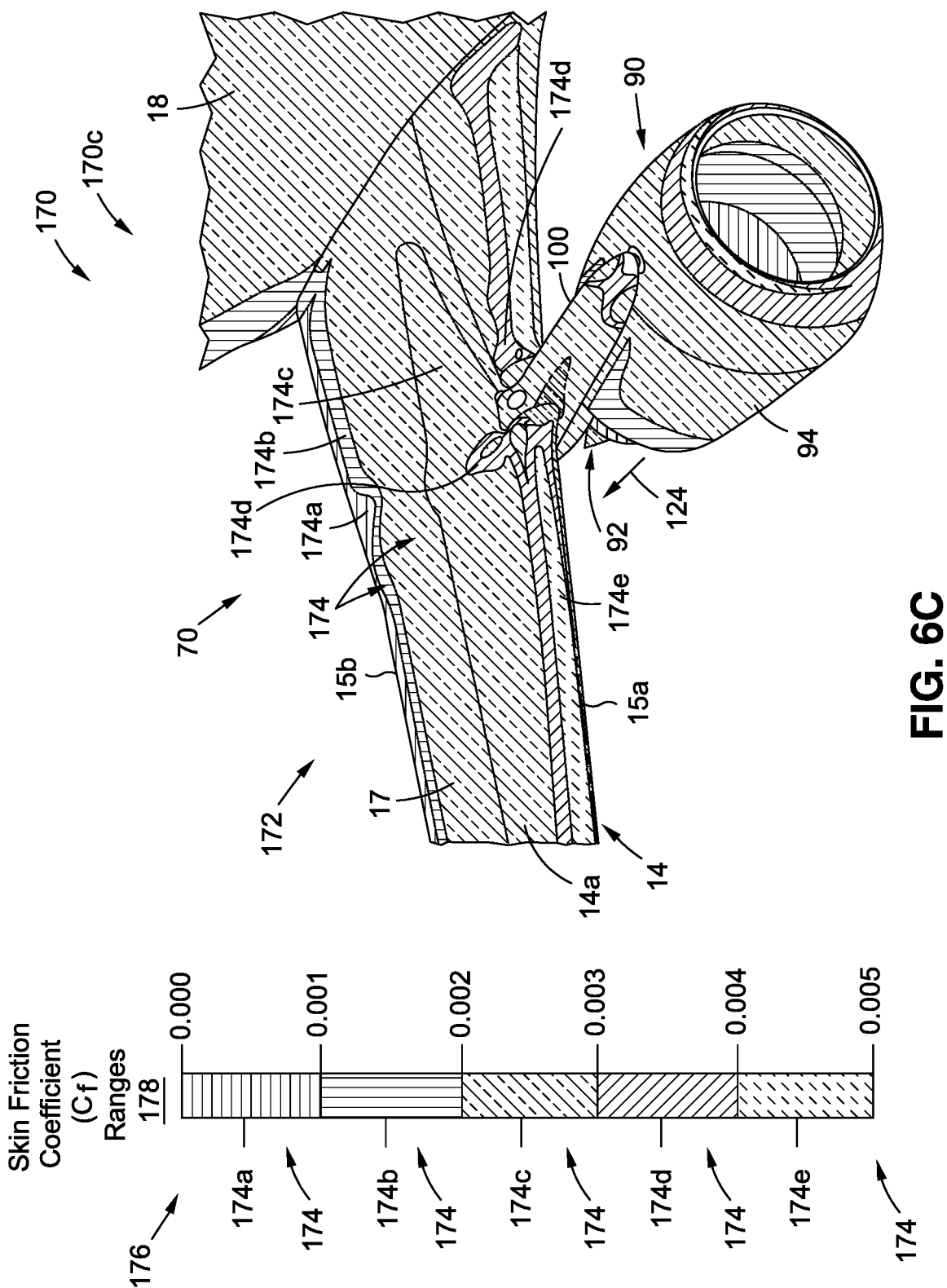

The nacelle 26 (see FIG. 1D) may comprise a shortened nacelle 26a (see FIGS. 1D, 7C) having a shorter length, measured from the nacelle leading edge 27a to the nacelle trailing edge 27b, as compared to a known nacelle 94 (see FIGS. 2, 6C) of a known engine 90 (see FIGS. 2, 6C). The nacelle 26 (see FIGS. 3, 4) further has a nacelle diameter 29 (see FIGS. 3, 4) having a length 29a (see FIG. 4).

With the forward over-wing-flow installation 50 (see FIGS. 1B-1C, 3, 4) of the low-fan-pressure-ratio engine 10 on the wing 14 (see FIG. 1A) of the aircraft 12 (see FIG. 1A), the nacelle trailing edge 27b (see FIGS. 1A, 4, 7C) has a top-most portion 116 (see FIGS. 4, 7C) positioned, or configured to be positioned, above the wing leading edge 15a (see FIGS. 4, 7C) of the wing 14 (see FIGS. 4, 7C). Preferably, the top-most portion 116 of the nacelle trailing edge 27b is positioned, or configured to be positioned, at a position 118 (see FIGS. 4, 7C) comprising a raised position 118a (see FIGS. 4, 7C) above the wing leading edge 15a, such as raised above an edge point of the wing leading edge 15a directly behind the nacelle trailing edge 27b. The top-most portion 116 (see FIGS. 4, 7C) of the nacelle trailing edge 27b may also be positioned, or configured to be positioned, at a position 118 (see FIG. 4) comprising a parallel position 118b (see FIG. 4) that is substantially parallel to the wing leading edge 15a (see FIG. 4). Further, with the forward over-wing-flow installation 50 (see FIGS. 1B-1C, 3, 4) of the low-fan-pressure-ratio engine 10 on the wing 14 (see FIG. 1A) of the aircraft 12 (see FIG. 1A), the nacelle 26 (see FIGS. 3, 4, 7C) is configured to be positioned, in its entirety, at a forward location 52 (see FIGS. 1B, 3, 4, 7C) in front of the wing leading edge 15a (see FIGS. 3, 4, 7C).

As shown in FIG. 1D, the low-fan-pressure-ratio engine 10 further comprises a plurality of outer guide vanes (OGVs) 54 in an outer guide vane (OGV) bank 55, where the OGVs 54 are axially disposed downstream of the fan 42, such as the variable pitch fan 42a. As shown in FIG. 1D, the plurality of outer guide vanes (OGVs) 54 and the plurality of fan blades 46 are both preferably axially disposed around at least one central shaft 56 located in the core 24. The at least one central shaft 56 (see FIG. 1D) is preferably aligned along a longitudinal center axis 66 of the low-fan-pressure-ratio engine 10. Each of the plurality of outer guide vanes (OGVs) 54 (see FIG. 1D) is nonrotatable and each extends radially outward from the core 24 (see FIG. 1D) to the nacelle 26 (see FIG. 1D). Each of the plurality of outer guide vanes (OGVs) 54 (see FIG. 1D) preferably has a thickness to chord (t/c) ratio in a range of from 3% to 9%.

As shown in FIG. 1D, in one version, the low-fan-pressure-ratio engine 10 may further comprise a compressor portion 58 positioned downstream of the plurality of outer guide vanes (OGVs) 54, a combustor portion 60 positioned downstream of the compressor portion 58, a turbine portion 62 positioned downstream of the combustor portion 60, a core nozzle 64, and the fan nozzle 44. As shown in FIG. 1D, the fan 42, such as the variable pitch fan 42a, the plurality of outer guide vanes (OGVs) 54, the compressor portion 58, the combustor portion 60, and part of the turbine portion 62, may be aligned along the at least one central shaft 56. FIG. 1D further shows a FWD (forward)/AFT direction indicator 68.

In general, the compressor portion 58 (see FIG. 1D) compresses the inlet air flow 120 (see FIG. 4) entering the core 24 (see FIG. 1D) from the engine inlet 40 (see FIG. 1D), the combustor portion 60 (see FIG. 1D) burns a mixture of fuel and the compressed air flow to generate a propulsive flow mixture, and the turbine portion 62 (see FIG. 1D) may be rotated by the propulsive flow mixture. Bypass air flow from the fan 42 typically provides thrust for the low-fan-pressure-ratio engine 10, such as in the form of turbofan engine 10d. The low-fan-pressure-ratio engine 10 described herein may employ a single-spool design, a two-spool design, a three-spool design, or another suitable turbofan machinery configuration. It will be appreciated by one skilled in the art that the structural components of the low-fan-pressure-ratio engine 10, as illustrated in FIG. 1D, represent a simplified assembly for illustrative purposes, and that the low-fan-pressure-ratio engine 10 may include additional structural components depending on the type of aircraft used and the type of propulsion and thrust required.

The low-fan-pressure-ratio engine 10 (see FIGS. 1A-1E, 4) is preferably mounted, or configured to be mounted, in the forward over-wing-flow installation 50 (see FIGS. 1B, 4), to the wing 14 (see FIGS. 1B, 4) of the aircraft 12 (see FIGS. 1B, 4). The forward over-wing-flow installation 50 of the low-fan-pressure-ratio engine 10 of the propulsion system 11 enables, during all flight phases 150 (see FIG. 4) of the aircraft 12, a fan flow exhaust 124 (see FIG. 4), exhausted by the variable pitch fan 42a, to flow behind the nacelle 26, and to be bifurcated by the wing leading edge 15a, so the fan flow exhaust 124 flows both over the wing 14 and under the wing 14. As shown in FIG. 4, the flight phases (FP) 150 comprise a cruise flight phase (FP) 150a, a takeoff flight phase (FP) 150b, a landing flight phase (FP) 150c, or another suitable flight phase 150. Thus, with the low-fan-pressure-ratio engine 10 (see FIGS. 1A-1E, 4) mounted in the forward over-wing-flow installation 50 (see FIGS. 1B, 4), the wing leading edge 15a (see FIGS. 1A, 4) bifurcates a fan flow 122, such as the fan flow exhaust 124, exhausted by the fan 42, such as the variable pitch fan 42a, to create a bifurcated fan flow 130 (see FIG. 4), such as a bifurcated fan flow exhaust 130a (see FIG. 4). A first portion 124a (see FIGS. 4, 7B) of the fan flow exhaust 124 (see FIGS. 4, 7B) flows over an upper surface area 17a (see FIG. 7B) of the upper surface 17 (see FIGS. 1B, 7B) of the wing 14, to obtain an over-wing flow 132 (see FIG. 4), such as an over-wing fan flow exhaust 132a (see FIG. 4). A second portion 124b (see FIG. 4) of the fan flow exhaust 124 (see FIGS. 4, 7B) flows over a lower surface area 16a (see FIG. 7A) of the lower surface 16 (see FIGS. 1A, 7A) of the wing 14, to obtain an under-wing flow 134 (see FIG. 4), such as an under-wing fan flow exhaust 134a (see FIG. 4).

In addition, during the cruise flight phase 150a (see FIG. 4) of the aircraft 12, the low-fan-pressure-ratio engine 10 preferably minimizes scrubbing drag 140 (see FIG. 4) of the fan flow exhaust 124 (see FIG. 4) to the wing 14, to obtain a reduced scrubbing drag 140a (see FIG. 4), that is surprisingly lower than expected. As used herein, "drag" means the aerodynamic force or resistance force that opposes an aircraft's motion or flight direction through the air. As used herein, "scrubbing drag" means the skin friction drag that is caused by an increased velocity of a fan flow exhaust plume exhausted by a fan, such as a variable pitch fan, of a turbofan engine, such as a low-fan-pressure-ratio engine, over an upper surface of a wing and flaps of an aircraft, as compared to ambient air flow over the remainder of the aircraft.

In addition, the fan flow exhaust 124 (see FIG. 4), exhausted by the variable pitch fan 42a behind the nacelle 26, assists in lift 144 (see FIG. 4) of the aircraft 12 during the takeoff flight phase 150b (see FIG. 4) of the aircraft 12, and during the landing flight phase 150c (see FIG. 4) of the aircraft 12. Thus, the low-fan-pressure-ratio engine 10 (see FIGS. 1A-1E, 4) provides a lift assist 144a (see FIG. 4) to the aircraft 12 during the takeoff flight phase 150b (see FIG. 4) and during the landing flight phase 150c (see FIG. 4). In addition, the fan flow exhaust 124 (see FIG. 4), exhausted by the variable pitch fan 42a behind the nacelle 26, minimally affects the lift 144 (see FIG. 4) of the aircraft 12 during the cruise flight phase 150a (see FIG. 4) of the aircraft 12.

The propulsion system 11 (see FIGS. 3, 4) and the low-fan-pressure-ratio engine 10 (see FIGS. 1E, 3, 4) may be used with a high lift system 73 (see FIGS. 1E, 3, 4), such as a modified high lift system 73a (see FIGS. 3, 4), operatively coupled to the at least one wing 14 (see FIGS. 1E, 3, 4), such as the first wing 14a (see FIGS. 1E, 3, 4) and the second wing 14b (see FIGS. 1E, 4). FIG. 1E shows the aircraft 12 in a high lift configuration 72, and FIG. 3 shows the wing 14 in the high lift configuration 72.

Now referring to FIG. 1E, FIG. 1E shows the aircraft 12 with the low-fan-pressure-ratio engine 10 in the high lift configuration 72, showing the high lift system 73 with the high lift devices 74 in a deployed position 76. The high lift system 73 (see FIGS. 1E, 3, 4) is deployed during a takeoff flight phase 150b (see FIG. 4) of the aircraft 12 and during a landing flight phase 150c (see FIG. 4) of the aircraft 12. As used herein, "high lift device" means a component, mechanism, or control surface, on an aircraft's wing, that increases the amount of lift produced by the wing, and the high lift device may be a fixed component, or a movable mechanism which is deployed when required.

As shown in FIG. 1E, the high lift devices 74 preferably comprise actuated lift devices 74a that are movable. As shown in FIG. 1E, the wings 14, such as first wing 14a and second wing 14b, each have the wing leading edge 15a. One or more high lift devices 74, such as leading edge devices 74b, are operatively coupled to the wing leading edge 15a, and one or more high lift devices 74, such as trailing edge devices 74c, are operatively coupled to the wing trailing edge 15b.

Figure 3:
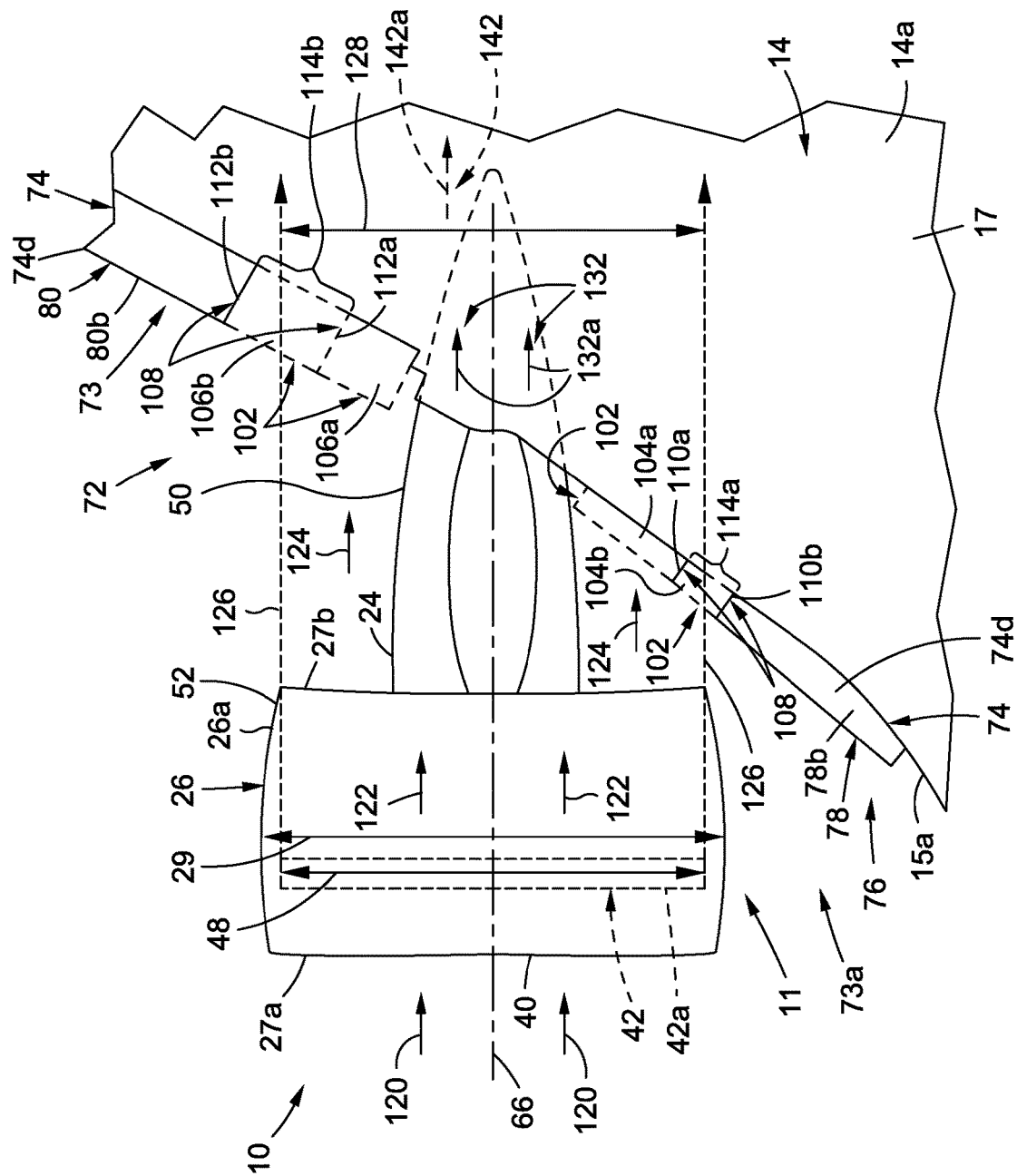
FIG. 3 is an illustration of a top plan view of a version of a low-fan-pressure-ratio engine of the disclosure, in a forward over-wing-flow installation, and showing a modified high lift system.

The high lift system 73 (see FIGS. 1E, 4) of the aircraft 12 (see FIGS. 1E, 4) preferably comprises the modified high lift system 73a (see FIGS. 3, 4), comprising one or more trimmed leading edge devices 74d, each having one or more trimmed portions 102 (see FIGS. 3, 4). As shown in FIG. 1E, the one or more trimmed leading edge devices 74d preferably include a leading edge flap 78, such as a trimmed inboard Krueger flap 78b, positioned between the fuselage 18 and the low-fan-pressure-ratio engine 10. The leading edge flap 78 preferably comprises a hinged flap that folds out from under the wing leading edge 15a.

As shown in FIG. 1E, the one or more trimmed leading edge devices 74d preferably further include one or more leading edge slats 80, such as one or more trimmed outboard slats 80b. As shown in FIG. 1E, the leading edge devices 74b (see FIG. 1E) may also comprise leading edge slats 80, such as outboard slats 80a, that are not trimmed. The leading edge slats 80 are small aerofoil shaped devices attached in front of the wing leading edge 15a that redirect the air flow at the front of the wing 14, allowing it to flow more smoothly over the upper surface 17 (see FIG. 3) when at a high angle of attack. This allows the wing 14 to be operated effectively at the higher angles required to produce additional lift.

FIG. 1E shows a trimmed leading edge 84 having a total trimmed length 82 of trimmed portions 102 (see FIG. 3), that have been trimmed from the leading edge devices 74b, on the wing leading edge 15a. The trimmed leading edge 84 (see FIG. 1E) and portions of the one or more trimmed leading edge devices 74d (see FIG. 1E) are preferably positioned directly behind the nacelle trailing edge 27b (see FIG. 1E) of the nacelle 26 (see FIG. 1E) of each low-fan-pressure-ratio engine 10 (see FIG. 1E). The trimmed leading edge 84 (see FIGS. 1E, 4) has a total trimmed length 82 (see FIGS. 1E, 4) preferably comprising at least 80% (eighty percent) of a length 15c (see FIG. 4) of the wing leading edge 15a (see FIGS. 1E, 4) positioned behind the nacelle trailing edge 27b (see FIGS. 1E, 4), and more preferably, comprising at least 90% (ninety percent) of a length 15c (see FIG. 4) of the wing leading edge 15a (see FIGS. 1E, 4) positioned directly behind the nacelle trailing edge 27b (see FIGS. 1E, 4) of the nacelle 26 (see FIGS. 1E, 4), and most preferably, comprising 100% (one hundred percent) of the length 15c (see FIG. 4) of the wing leading edge 15a (see FIGS. 1E, 4) positioned directly behind the nacelle trailing edge 27b (see FIGS. 1E, 4) of the nacelle 26 (see FIGS. 1E, 4). In other words, preferably, at least 80% (eighty percent) of the wing leading edge 15a that is directly behind the nacelle trailing edge 27b is not comprised of a high lift device 74, and more preferably, at least 90% (ninety percent) of the wing leading edge 15a that is directly behind the nacelle trailing edge 27b is not comprised of a high lift device 74, and most preferably, 100% (one hundred percent) of the wing leading edge 15a that is directly behind the nacelle trailing edge 27b is not comprised of a high lift device 74. Preferably, the total trimmed length 82 (see FIG. 1E) substantially corresponds to a length 48a (see FIG. 4) of the fan diameter 48 (see FIGS. 3, 4) of the fan 42 (see FIG. 4), such as the variable pitch fan 42a (see FIG. 4). For example, the total trimmed length 82 preferably depends on the length 48a (see FIG. 4) of the fan diameter 48 (see FIGS. 3, 4) of the fan 42 (see FIGS. 3, 4), such as the variable pitch fan 42a (see FIGS. 3, 4), and preferably depends on how high above the wing leading edge 15a (see FIGS. 3, 4, 7C) the top-most portion 116 (see FIGS. 4, 7C) of the nacelle trailing edge 27b (see FIGS. 4, 7C) is positioned, that is, the height 118c (see FIG. 4), or distance, of the raised position 118a (see FIGS. 4, 7C) of the nacelle trailing edge 27b above the wing leading edge 15a.

As shown in FIG. 1E, the trailing edge devices 74c may comprise one or more trailing edge flaps 86 positioned behind the one or more trimmed leading edge devices 74d. The one or more trailing edge flaps 86 (see FIG. 1E) are movable portions of the wing 14 that may be lowered to produce additional lift, and when the trailing edge flaps 86 are lowered, this reshapes the wing trailing edge 15b to give it additional camber. The one or more trailing edge flaps 86 (see FIG. 1E) include one or more inboard trailing edge flaps 86a and one or more outboard trailing edge flaps 86b. The one or more trailing edge flaps 86 (see FIG. 1E) preferably have a limited angular motion 88 (see FIG. 4) and a simplified flap architecture 87 (see FIG. 4). For example, the one or more trailing edge flaps 86 (see FIGS. 1E, 4) preferably comprise a simple hinge flap 86c (see FIG. 4), a plain flap 86d (see FIG. 4), a single part flap 86e (see FIG. 4), or another suitable trailing edge flap 86 having a simplified flap architecture 87, instead of having a complex architecture, such as a Fowler flap, a double-slotted Fowler flap, two component or double element flap, or another flap having a complex architecture or structure.

As shown in FIG. 1E, the wing trailing edge 15b of each wing 14 may further comprise trailing edge devices 74c such as one or more ailerons 89, positioned near the tips or ends of the wings 14. The high lift system 73 may be controlled with a control system comprising cockpit controls controlled by a pilot or operator of the aircraft, connecting linkages, and other suitable operating mechanisms to control the aircraft's 12 lift and direction while in the various flight phases 150 (see FIG. 4).

Now referring to FIG. 2, FIG. 2 is an illustration of a top plan view of a known engine 90 in a known under-wing installation 92. FIG. 2 shows the known engine 90 with the known nacelle 94, and shows the wing 14 in a high lift configuration 72 with high lift devices 74, such as leading edge devices 74b, in a deployed position 76. FIG. 2 shows the known engine 90 coupled or attached to the wing 14, such as the first wing 14a, via a known pylon 100. As shown in FIG. 2, the wing 14 has the wing leading edge 15a with a leading edge flap 78, such as in the form of an inboard Krueger flap 78a that has not been trimmed, and has a leading edge slat 80, such as in the form of an outboard slat 80a that has not been trimmed. FIG. 2 further shows the known nacelle 94 with a nacelle diameter 95. FIG. 2 further shows a known fan 96 shrouded by the known nacelle 94, and a fan diameter 98. The inboard Krueger flap 78a (see FIG. 2) and the outboard slat 80a (see FIG. 2) do not overlap with any fan flow exhaust exhausted by the known fan 96, because the inboard Krueger flap 78a (see FIG. 2) and the outboard slat 80a (see FIG. 2) are positioned above a fan flow exhaust plume.

Now referring to FIG. 3, FIG. 3 is an illustration of a top plan view of a version of the low-fan-pressure-ratio engine 10 of the disclosure, in the forward over-wing-flow installation 50, showing trimmed leading edge devices 74d in the deployed position 76. FIG. 3 shows the nacelle 26, such as a shortened nacelle 26a, having the nacelle leading edge 27a and the nacelle trailing edge 27b, and shows a nacelle diameter 29 of the nacelle 26. FIG. 2 further shows the engine inlet 40, the fan 42, such as the variable pitch fan 42a, shrouded by the nacelle 26, the fan diameter 48, and the core 24. The longitudinal center axis 66 (see FIG. 3) runs through the center of the low-fan-pressure-ratio engine 10 (see FIG. 3).

As shown in FIG. 3, the nacelle 26 is positioned, in its entirety, at a forward location 52 in front of the wing leading edge 15a. As shown in FIG. 3, the low-fan-pressure-ratio engine 10 is in the forward over-wing-flow installation 50, and is coupled or attached to the wing 14, such as the first wing 14a. FIG. 3 shows an inlet air flow 120 flowing into the engine inlet 40 of the low-fan-pressure-ratio engine 10 toward the fan 42, such as the variable pitch fan 42a. After flowing through the fan 42, such as the variable pitch fan 42a, a large fraction or portion of the inlet air flow 120 becomes fan flow 122 (see FIG. 3) that is exhausted out of the nacelle trailing edge 26b as fan flow exhaust 124. The fan flow exhaust 124 (see FIG. 3) may be in the form of a fan flow exhaust plume 126 (see FIG. 3) flowing outwardly past the nacelle trailing edge 27b toward the trimmed leading edge devices 74d and toward the trimmed portions 102 of the trimmed leading edge devices 74d, and then flowing over the upper surface 17 (see FIG. 3) of the wing 14 as over-wing flow 132 (see FIG. 3), such as in the form of over-wing fan flow exhaust 132a (see FIG. 3). FIG. 3 further shows core flow 142, such as core flow exhaust 142a, exhausted from the core 24 under the wing 14, along the lower surface 16 (see FIG. 1A) of the wing 14.

FIG. 3 further shows the high lift system 73, such as in the form of the modified high lift system 73a, for the wing leading edge 15a. As shown in FIG. 3, the modified high lift system 73a comprises the trimmed leading edge devices 74d, including the leading edge flap 78, such as the trimmed inboard Krueger flap 78b, and the leading edge slats 80, such as the trimmed outboard slat 80b.

As shown in FIG. 3, the trimmed inboard Krueger flap 78b may include one or more trimmed portions 102, for example, a first trimmed portion 104a and a second trimmed portion 104b. The trimmed inboard Krueger flap 78b (see FIG. 3) may be trimmed at various trim locations 108 (see FIG. 3), or trim planes. As shown in FIG. 3, the first trimmed portion 104a may be trimmed or removed at a first trim location 110a, or trim plane, and if additional trimming is desired, a second trimmed portion 104b may be trimmed or removed at a second trim location 110b, or trim plane. However, the trim locations 108 are not limited to the first trim location 110a and the second trim location 110b, and the trimmed inboard Krueger flap 78b (see FIG. 3) may be trimmed at a range 114a (see FIG. 3) of trim locations 108 (see FIG. 3), or trim planes, such as between the first trim location 110a (see FIG. 3) and the second trim location 110b (see FIG. 3), or at another suitable trim location 108 along the leading edge flap 78, depending on the total trimmed length 82 (see FIGS. 1E, 4) desired, and depending on the length 48a (see FIG. 4) of the fan diameter 48 (see FIG. 3). The trim locations 108 (see FIG. 3), or trim planes, represent possible locations or areas that may limit or avoid the trimmed inboard Krueger flap 78b (see FIG. 3) from being immersed in a fan flow exhaust plume 126 (see FIG. 3) of fan flow exhaust 124 (see FIG. 3) exhausted by the fan 42 (see FIG. 3), such as the variable pitch fan 42a (see FIG. 3). Preferably, the total trimmed length 82 (see FIGS. 1E, 4) of the trimmed leading edge 84 (see FIGS. 1E, 4) covers, or substantially covers, at least 80% (eighty percent) of a width 128 (see FIGS. 1C, 3, 4) of the fan flow exhaust plume 126 (see FIGS. 3, 4), and more preferably, covers, or substantially covers, at least 90% (ninety percent) of the width 128 (see FIGS. 1C, 3, 4) of the fan flow exhaust plume 126 (see FIGS. 3, 4), and most preferably, covers, or substantially covers, 100% (one hundred percent) of the width 128 (see FIGS. 1C, 3, 4) of the fan flow exhaust plume 126 (see FIGS. 3, 4).

As further shown in FIG. 3, the trimmed outboard slat 80b may include one or more trimmed portions 102, for example, a first trimmed portion 106a and a second trimmed portion 106b. The trimmed outboard slat 80b (see FIG. 3) may be trimmed at various trim locations 108 (see FIG. 3), or trim planes. As shown in FIG. 3, the first trimmed portion 106a may be trimmed or removed at a first trim location 112a, or trim plane, and if additional trimming is desired, a second trimmed portion 106b may be trimmed or removed at a second trim location 112b, or trim plane. However, the trim locations 108 are not limited to the first trim location 112a and the second trim location 112b, and the trimmed outboard slat 80b (see FIG. 3) may be trimmed at a range 114b (see FIG. 3) of trim locations 108 (see FIG. 3), or trim planes, such as between the first trim location 112a (see FIG. 3) and the second trim location 112b (see FIG. 3), or at another suitable trim location 108 along the leading edge flap 78, depending on the total trimmed length 82 (see FIGS. 1E, 4) desired, and depending on the length 48a (see FIG. 4) of the fan diameter 48 (see FIG. 3). The trim locations 108 (see FIG. 3), or trim planes, represent possible locations or areas that may limit or avoid the trimmed outboard slat 80b (see FIG. 3) from being immersed in a fan flow exhaust plume 126 (see FIG. 3) of fan flow exhaust 124 (see FIG. 3) exhausted by the fan 42 (see FIG. 3), such as the variable pitch fan 42a (see FIG. 3).

As shown in FIG. 1E, the trimmed portions 102 that are removed from the trimmed inboard Krueger flap 78b and the trimmed outboard slat 80b are preferably positioned directly behind the nacelle trailing edge 27b of the nacelle 26, and preferably comprise a total trimmed length 82 (see FIGS. 1E, 4) preferably comprising at least 80% (eighty percent) of a length 15c (see FIG. 4) of the wing leading edge 15a positioned directly behind the nacelle trailing edge 27b, and more preferably, comprising at least 90% (ninety percent) of the length 15c (see FIG. 4) of the wing leading edge 15a positioned directly behind the nacelle trailing edge 27b, and most preferably, comprising 100% (one hundred percent) of the length 15c (see FIG. 4) of the wing leading edge 15a positioned directly behind the nacelle trailing edge 27b. Preferably, the total trimmed length 82 (see FIG. 1E) of the trimmed portions 102 (see FIG. 3) substantially corresponds to the fan diameter 48 (see FIG. 3) of the fan 42 (see FIG. 3), such as the variable pitch fan 42a (see FIG. 3). In other words, preferably, at least 80% (ninety percent) of the wing leading edge 15a that is directly behind the nacelle trailing edge 27b is not comprised of a high lift device 74, and more preferably, at least 90% (ninety percent) of the wing leading edge 15a that is directly behind the nacelle trailing edge 27b is not comprised of a high lift device 74, and most preferably, 100% (one hundred percent) of the wing leading edge 15a that is directly behind the nacelle trailing edge 27b is not comprised of a high lift device 74. For example, the total trimmed length 82 of the trimmed portions 102 preferably depends on the length 48a (see FIG. 4) of the fan diameter 48 (see FIGS. 3, 4) of the fan 42 (see FIGS. 3, 4), such as the variable pitch an 42a (see FIGS. 3, 4), and depends on how high above the wing leading edge 15a (see FIGS. 3, 4, 7C) the top-most portion 116 (see FIGS. 4, 7C) of the nacelle trailing edge 27b (see FIGS. 4, 7C) is positioned, that is, the height 118c (see FIG. 4) of the raised position 118a (see FIGS. 4, 7C) of the nacelle trailing edge 27b above the wing leading edge 15a.

Now referring to FIG. 4, as discussed above, in another version disclosed herein there is provided the aircraft 12 comprising the fuselage 18, and at least one wing 14 operatively coupled to the fuselage 18, where each wing 14 has the wing leading edge (LE) 15a and the wing trailing edge (TE) 15b, and a length 15c of the wing leading edge 15a positioned directly behind the nacelle trailing edge 27b of the nacelle 26.

As shown in FIG. 4, the aircraft 12 further comprises the propulsion system 11 operatively coupled to the at least one wing 14, where the propulsion system 11 comprises the low-fan-pressure-ratio engine 10 coupled to the at least one wing 14, in the forward over-wing-flow installation 50. The low-fan-pressure-ratio engine 10 (see FIG. 4) may comprise a first low-fan-pressure-ratio engine 10a and a second low-fan-pressure-ratio engine 10b, may be in the form of a very-high-bypass-ratio engine 10c (see FIG. 4), and is preferably a turbofan engine 10d (see FIG. 4). The low-fan-pressure-ratio engine 10 (see FIG. 4) further comprises a length to diameter (L/D) ratio 38 (see FIG. 4) of the nacelle 26 (see FIG. 4) in a range of from 0.6 to 1.0. The low-fan-pressure-ratio engine 10 (see FIG. 4) further comprises a fan-pressure-ratio 36 (see FIG. 4) in a range of from 1.15 to 1.30. The low-fan-pressure-ratio engine 10 (see FIG. 4) preferably comprises a very-high-bypass-ratio engine 10c (see FIG. 4) having a bypass ratio 37 (see FIG. 4) in a range of from 20 to 40.

As shown in FIG. 4, the low-fan-pressure-ratio engine 10 comprises the core 24, the fan 42, such as the variable pitch fan 42a, coupled to the core 24, and the nacelle 26 surrounding the variable pitch fan 42a and a portion 28 (see FIG. 1D) of the core 24. As shown in FIG. 4, the fan 42 is preferably a large diameter fan 42b and has the fan diameter 48 with a length 48a. The low-fan-pressure-ratio engine 10 may comprise a fan 42 other than the variable pitch fan 42a, in combination with a fan nozzle 44 (see FIG. 4), such as in the form of a variable area fan nozzle 44a (see FIG. 4), or another suitable variable fan mechanism. The fan 42 (see FIG. 4) has a plurality of fan blades 46 (see FIG. 4).

As shown in FIG. 4, the nacelle 26 has the nacelle leading edge (LE) 27a, the nacelle trailing edge (TE) 27b, and the nacelle diameter 29 having a length 29a. The nacelle trailing edge 27b (see FIG. 4) has a top-most portion 116 (see FIG. 4) positioned above the wing leading edge 15a (see FIG. 4). Preferably, the top-most portion 116 (see FIG. 4) of the nacelle trailing edge 27b (see FIG. 4) is positioned at a position 118 (see FIG. 4) comprising a raised position 118a (see FIG. 4) raised above the wing leading edge 15a, such as raised above an edge point of the wing leading edge 15a directly behind the nacelle trailing edge 27b. The nacelle 26 is configured to be positioned, in its entirety, at the forward location 52 (see FIG. 4) relative to the wing leading edge 15a.

The forward over-wing-flow installation 50 (see FIG. 4) of the low-fan-pressure-ratio engine 10 of the propulsion system 11 enables, during all flight phases 150 (see FIG. 4) of the aircraft 12, a fan flow exhaust 124 (see FIG. 4), exhausted by the variable pitch fan 42a, to flow behind the nacelle 26, and to be bifurcated by the wing leading edge 15a, so the fan flow exhaust 124 flows both over the wing 14 and under the wing 14. Further, during a cruise flight phase 150a (see FIG. 4) of the aircraft 12, the low-fanpressure-ratio engine 10 minimizes scrubbing drag 140 (see FIG. 4) of the fan flow exhaust 124 to the wing 14.

As shown in FIG. 4, the aircraft 12 may further comprise a high lift system (HLS) 73, such as a modified high lift system (HLS) 73a, operatively coupled to the wing 14, and which is deployed in a high lift configuration 72 during the takeoff flight phase 150b of the aircraft 12 and during the landing flight phase 150c of the aircraft 12, and which is stowed in the cruise configuration 70 during the cruise flight phase 150a of the aircraft 12. As discussed in detail above, the high lift system 73 comprises one or more high lift devices 74 (see FIG. 4) operatively coupled to the wing leading edge 15a and one or more high lift devices 74 coupled to a wing trailing edge 15b. The high lift devices 74 (see FIG. 4) preferably comprise actuated lift devices 74a (see FIG. 4) that are movable. The high lift devices 74 (see FIG. 4) comprise one or more leading edge flaps 78 (see FIG. 4) and one or more leading edge slats 80 (see FIG. 4).

With the modified high lift system 73a (see FIG. 4), the one or more high lift devices 74 (see FIG. 4) comprise one or more trimmed leading edge devices 74d (see FIGS. 1E, 3), such as a trimmed inboard Krueger flap 78b (see FIG. 3) and a trimmed outboard slat 80b (see FIG. 3), each having one or more trimmed portions 102 (see FIG. 4) that are trimmed or removed at one or more trim locations 108 (see FIG. 4), or trim planes. The one or more trimmed leading edge devices 74d (see FIGS. 1E, 3) are positioned, or configured to be positioned, directly behind the nacelle trailing edge 27b of the nacelle 26. The one or more trimmed portions 102 (see FIG. 4) preferably have a total trimmed length 82 (see FIG. 4) substantially corresponding to a length 48a (see FIG. 4) of a fan diameter 48. The total trimmed length 82 preferably depends on the length 48a of the fan diameter 48, and depends on a height 118c (see FIG. 4), or distance, of a raised position 118a (see FIGS. 4, 7C) of the top-most portion 116 (see FIGS. 4, 7C) of the nacelle trailing edge 27b (see FIGS. 4, 7C) that is raised above the wing leading edge 15a (see FIGS. 4, 7C). As shown in FIG. 4, the one or more high lift devices 74 further comprise one or more trailing edge flaps 86, including one or more inboard trailing edge (TE) flaps 86a and one or more outboard trailing edge (TE) flaps 86b. The one or more inboard trailing edge flaps 86a (see FIG. 4) are preferably positioned, or configured to be positioned, behind the one or more trimmed leading edge devices 74d, and preferably have a limited angular motion 88 (see FIG. 4) and a simplified flap architecture 87 (see FIG. 4). The one or more trailing edge flaps 86, such as the one or more inboard trailing edge flaps 86a may comprise one or more of, a simple hinge flap 86c (see FIG. 4), a plain flap 86d (see FIG. 4), a single part flap 86e (see FIG. 4), or another suitable flap.

Figure 5:
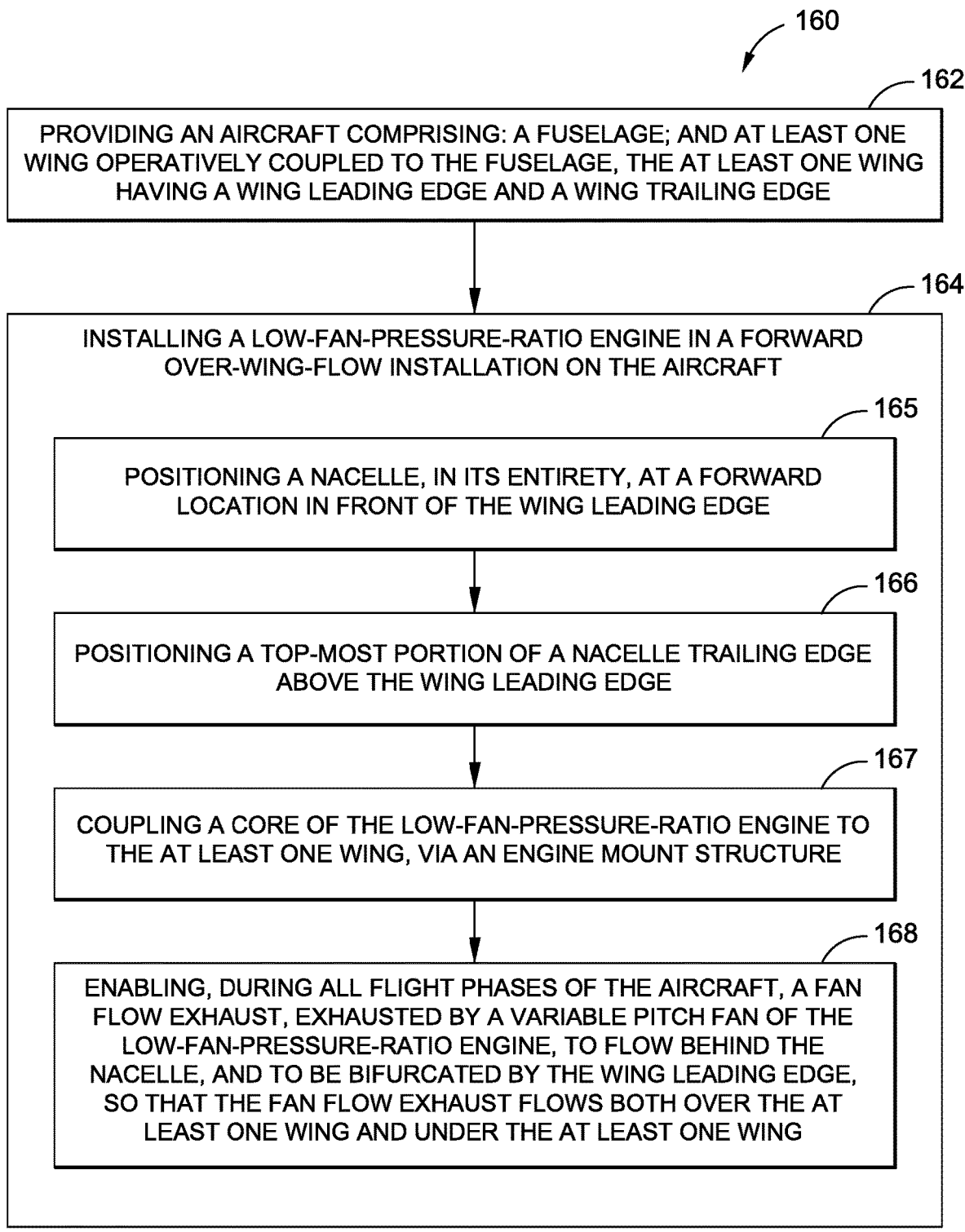
FIG. 5 is an illustration of a flow diagram of a version of a method of installing a low-fan-pressure-ratio engine in a forward over-wing-flow installation on an aircraft.

Now referring to FIG. 5, in another version there is provided a method 160 of installing a low-fan-pressure-ratio engine 10 (see FIGS. 1A-1E, 4) in a forward over-wing-flow installation 50 (see FIGS. 1C, 4) on an aircraft 12 (see FIGS. 1A-1C, 4). FIG. 5 is an illustration of a flow diagram of a version of the method 160 of installing the low-fan-pressure-ratio engine 10 (see FIGS. 1A-1E, 4) in the forward over-wing-flow installation 50 (see FIG. 1C, 4) on the aircraft 12 (see FIGS. 1A-1C, 4).

As shown in FIG. 5, the method 160 comprises the step 162 of providing the aircraft 12. The aircraft 12 (see FIGS. 1A-1C, 4) comprises a fuselage 18 (see FIGS. 1A-1B, 4). The aircraft 12 further comprises at least one wing 14 (see FIGS. 1A-1B, 4) operatively coupled to the fuselage 18. Preferably, the aircraft 12 has two wings 14, including a first wing 14a (see FIGS. 1A-1B) and a second wing 14b (see FIGS. 1A-1B). The at least one wing 14 has a wing leading edge 15a (see FIGS. 1A-1B, 4) and a wing trailing edge 15b (see FIGS. 1A-1B, 4).

As shown in FIG. 5, the method 160 further comprises the step 164 of installing the low-fan-pressure-ratio engine 10 (see FIGS. 1A-1E, 4) in the forward over-wing-flow installation 50 (see FIG. 1C, 4) on the aircraft 12 (see FIGS. 1A-1C, 4). As discussed in detail above, the low-fan-pressure-ratio engine 10 comprises the core 24 (see FIGS. 1A-1D) having the first end 30 (see FIG. 1A) and the second end 32 (see FIG. 1A). The low-fan-pressure-ratio engine 10 (see FIG. 1D) further comprises the fan 42 (see FIG. 1D), such as the variable pitch fan 42a (see FIG. 1D), coupled to the first end 30 (see FIG. 1D) of the core 24 (see FIG. 1D).

The low-fan-pressure-ratio engine 10 (see FIG. 1D) further comprises the nacelle 26 (see FIG. 1D), or fan cowl, surrounding the fan 42 (see FIG. 1D), such as the variable pitch fan 42a (see FIG. 1D). The nacelle 26 (see FIG. 1D) also surrounds a portion 28 (see FIG. 1D) of the core 24 (see FIG. 1D). For example, the first end 30 of the core 24 may be positioned inside the nacelle 26. The nacelle 26 (see FIG. 1D) has a nacelle leading edge 27a (see FIG. 1D) and a nacelle trailing edge 27b (see FIG. 1D). The low-fan-pressure-ratio engine 10 (see FIGS. 1D, 4) further comprises the length to diameter (L/D) ratio 38 (see FIG. 4) of the nacelle 26 (see FIGS. 1D, 4) in a range of from 0.6 to 1.0. The low-fan-pressure-ratio engine 10 (see FIGS. 1D, 4) further comprises the fan-pressure-ratio 36 (see FIG. 4) in a range of from 1.10 to 1.30. The low-fan-pressure-ratio engine 10 (see FIGS. 1D, 4) may comprise a very-high-bypass-ratio engine 10c (see FIG. 4) having a bypass ratio 37 (see FIG. 4) in a range of from about 15 to 50.

As shown in FIG. 5, the step 164 of installing the low-fan-pressure-ratio engine 10 (see FIGS. 1A-1E, 4) in the forward over-wing-flow installation 50 (see FIG. 1C, 4) on the aircraft 12 (see FIGS. 1A-1C, 4) comprises the sub-step 165 of positioning the nacelle 26, in its entirety, at a forward location 52 (see FIGS. 1B, 3, 4) in front of the wing leading edge 15a (see FIGS. 1B, 3, 4).

As shown in FIG. 5, the step 164 of installing the low-fan-pressure-ratio engine 10 (see FIGS. 1A-1E, 4) in the forward over-wing-flow installation 50 (see FIG. 1C, 4) on the aircraft 12 (see FIGS. 1A-1C, 4) further comprises the sub-step 166 of positioning a top-most portion 116 (see FIGS. 4, 7C) of the nacelle trailing edge 27b (see FIGS. 4, 7C), at, or above, the wing leading edge 15a (see FIGS. 4, 7C) of the wing 14 (see FIGS. 4, 7C). The sub-step 166 of positioning the top-most portion 116 of the nacelle trailing edge 27b above the wing leading edge 15a further comprises positioning the top-most portion 116 of the nacelle trailing edge 27b at a position 118 (see FIGS. 4, 7C) comprising a raised position 118a (see FIG. 4) above the wing leading edge 15a, such as above an edge point of the wing leading edge 15a directly behind the nacelle trailing edge 27b.

As shown in FIG. 5, the step 164 of installing the low-fan-pressure-ratio engine 10 (see FIGS. 1A-1E, 4) in the forward over-wing-flow installation 50 (see FIG. 1C, 4) on the aircraft 12 (see FIGS. 1A-1C, 4) further comprises the sub-step 167 of coupling the core 24 to the at least one wing 14, via an engine mount structure 35 (see FIG. 1B), such as a pylon 35a (see FIG. 1B).

As shown in FIG. 5, the step 164 of installing the low-fan-pressure-ratio engine 10 (see FIGS. 1A-1E, 4) in the forward over-wing-flow installation 50 (see FIG. 1C, 4) on the aircraft 12 (see FIGS. 1A-1C, 4) further comprises the sub-step 168 of enabling, during all flight phases 150 (see FIG. 4) of the aircraft 12, a fan flow exhaust 124 (see FIG. 4), exhausted by the variable pitch fan 42a, to flow behind the nacelle 26, and to be bifurcated by the wing leading edge 15a, so the fan flow exhaust 124 flows both over the at least one wing 14 and under the at least one wing 14.

The step 164 of installing the low-fan-pressure-ratio engine 10 in the forward over-wing-flow installation 50 may further comprise enabling, during a cruise flight phase 150a (see FIG. 4) of the aircraft 12, the low-fan-pressure-ratio engine 10 to minimize scrubbing drag 140 (see FIG. 4) of the fan flow exhaust 124 (see FIG. 4) to the wing 14.

The step 164 of installing the low-fan-pressure-ratio engine 10 in the forward over-wing-flow installation 50 may further comprise enabling the fan flow exhaust 124 (see FIG. 4), exhausted by fan 42 (see FIG. 4), such as the variable pitch fan 42a (see FIG. 4), behind the nacelle 26 (see FIG. 4), to assist in lift 144 (see FIG. 4) of the aircraft 12 during a takeoff flight phase 150b (see FIG. 4) of the aircraft 12, and during a landing flight phase 150c (see FIG. 4) of the aircraft 12. The step 164 of installing the low-fan-pressure-ratio engine 10 in the forward over-wing-flow installation 50 may further comprise enabling the fan flow exhaust 124 (see FIG. 4), exhausted by the fan 42 (see FIG. 4), such as the variable pitch fan 42a (see FIG. 4), behind the nacelle 26 (see FIG. 4), to only minimally affect the lift 144 (see FIG. 4) of the aircraft 12 during the cruise flight phase 150a (see FIG. 4) of the aircraft 12.

The step 162 (see FIG. 5) of providing the aircraft 12 may further comprises providing the aircraft 12 having a high lift system 73 (see FIGS. 3, 4), such as a modified high lift system 73a, operatively coupled to the at least one wing 14. The high lift system 73 comprises one or more high lift devices 74 (see FIGS. 3, 4) operatively coupled to the wing leading edge 15a (see FIGS. 3, 4) and to the wing trailing edge 15b (see FIGS. 3, 4). The modified high lift system 73 has one or more high lift devices 74 (see FIGS. 3, 4) comprising one or more trimmed leading edge devices 74d (see FIGS. 3,4). Each of the one or more trimmed leading edge devices 74d (see FIGS. 3,4) has one or more trimmed portions 102 (see FIGS. 3, 4) that may be trimmed or removed from one or more trim locations 108 (see FIG. 3), or trim planes. The one or more trimmed leading edge devices 74d are positioned directly behind the nacelle 26 (see FIGS. 3, 4). The one or more trimmed portions 102 (see FIGS. 3, 4) preferably have a total trimmed length 82 (see FIGS. 1E, 4) substantially corresponding to a length 48a (see FIG. 4) of the fan diameter 48 (see FIGS. 3, 4) of the fan 42 (see FIGS. 3, 4), such as the variable pitch fan 42a (see FIGS. 3, 4). The total trimmed length 82 preferably depends on the length 48a of the fan diameter 48, and depends on a height 118c (see FIG. 4), or distance, of a raised position 118a (see FIGS. 4, 7C) of the top-most portion 116 (see FIGS. 4, 7C) of the nacelle trailing edge 27b (see FIGS. 4, 7C) that is raised above the wing leading edge 15a (see FIGS. 4, 7C). The one or more trailing edge flaps 86 (see FIGS. 1E, 4), and preferably, the one or more inboard trailing edge flaps 86a, are positioned behind the one or more trimmed leading edge devices 74d (see FIGS. 3, 4). The one or more trailing edge flaps 86 (see FIGS. 1E, 4) preferably have a limited angular motion 88 (see FIG. 4) and a simplified flap architecture 87 (see FIG. 4).

The step 162 (see FIG. 5) of providing the aircraft 12 further comprises providing the aircraft 12 having a landing gear assembly 19 (see FIGS. 1A, 4) or landing gear assemblies 19, and further wherein the step 164 of installing the low-fan-pressure-ratio engine 10 in the forward over-wing-flow installation 50 does not require changing the length 19a (see FIG. 4), or the weight 19b (see FIG. 4), of the landing gear assembly 19 or landing gear assemblies 19.

Figure 7A:
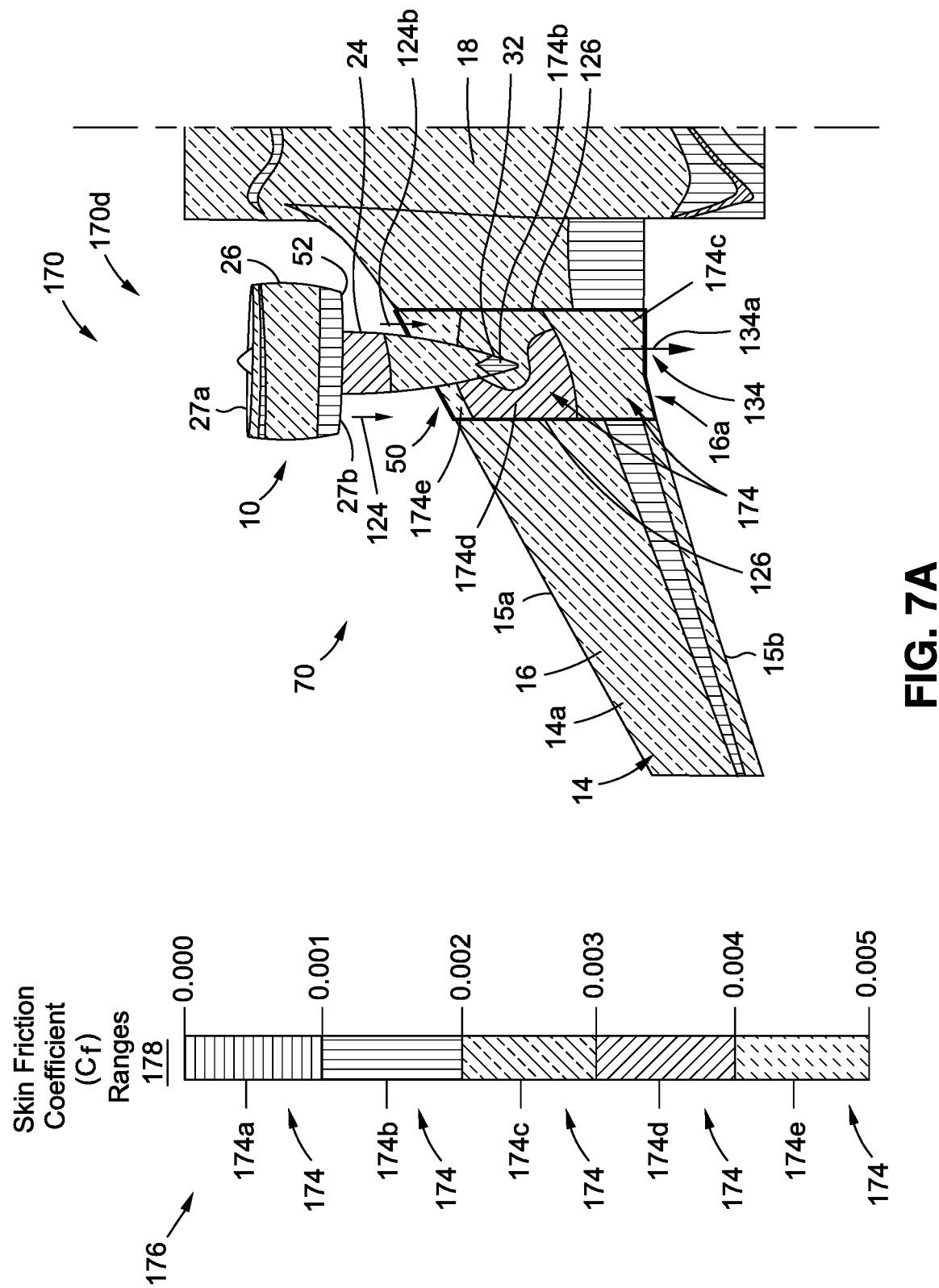
Figure 7B:
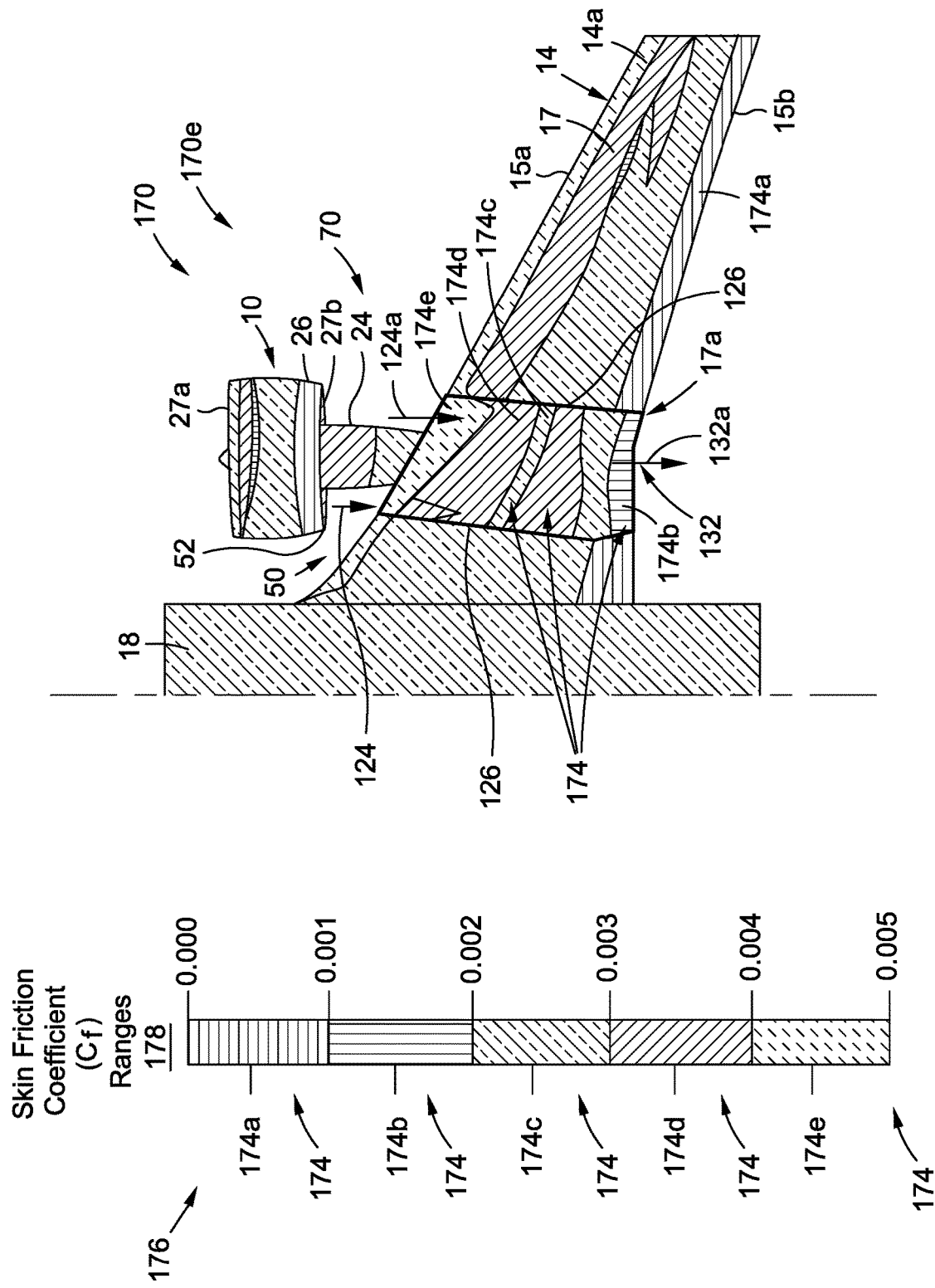

Now referring to FIGS. 6A-6C and 7A-7C, FIGS. 6A-6C are illustrations of skin friction coefficient maps 170 of various skin friction coefficient regions 174 on a known under-wing installation 92 in a cruise configuration 70, and FIGS. 7A-7C are illustrations of skin friction coefficient maps 170 of various skin friction coefficient regions 174 on a forward over-wing-flow (OWF) installation 50 of the disclosure, in a cruise configuration 70. The skin friction coefficient maps 170, as shown in FIGS. 6A-6C and FIGS. 7A-7C, were obtained using computational fluid dynamics (CFD) simulations and mapping the results. Skin friction coefficient ($C_f$) is also referred to as skin friction drag coefficient.

Referring to FIGS. 6A-6C and 7A-7C, FIGS. 6A-6C each show a legend 176 of skin friction coefficient regions 174 on the known under-wing installation 92 at various skin friction coefficient ($C_f$) ranges 178, and FIGS. 7A-7C each show the legend 176 of skin friction coefficient regions 174 on the forward over-wing-flow installation 50 at various skin friction coefficient ($C_f$) ranges 178. As shown in FIGS. 6A-6C and 7A-7C, the various skin friction coefficient ($C_f$) ranges 178 include a first skin friction coefficient region 174a corresponding to the skin friction coefficient ($C_f$) range 178 between 0.000 $C_f$ and 0.001 $C_f$; a second skin friction coefficient region 174b corresponding to the skin friction coefficient ($C_f$) range 178 between 0.001 $C_f$ and 0.002 $C_f$; a third skin friction coefficient region 174c corresponding to the skin friction coefficient ($C_f$) range 178 between 0.002 $C_f$ and 0.003 $C_f$; a fourth skin friction coefficient region 174d corresponding to the skin friction coefficient ($C_f$) range 178 between 0.003 $C_f$ and 0.004 $C_f$; and a fifth skin friction coefficient region 174e corresponding to the skin friction coefficient ($C_f$) range 178 between 0.004 $C_f$ and 0.005. $C_f$.

The first skin friction coefficient region 174a (see FIGS. 6A-6C, 7A-7C) corresponding to the skin friction coefficient ($C_f$) range 178 (see FIGS. 6A-6C, 7A-7C) between 0.000 $C_f$ and 0.001 $C_f$; indicated no or minimal scrubbing or or scrubbing drag 140 (see FIG. 4) by the fan flow 122 (see FIG. 4), such as the fan flow exhaust 124 (see FIG. 4), blown over the wing 14 (see FIGS. 6A-6C, 7A-7C). In contrast, the fifth skin friction coefficient region 174e (see FIGS. 6A-6C, 7A-7C) corresponding to the skin friction coefficient ($C_f$) range 178 between 0.004 $C_f$ and 0.005 $C_f$ indicated scrubbing or scrubbing drag 140 (see FIG. 4) by the fan flow 122 (see FIG. 4), such as the fan flow exhaust 124 (see FIG. 4), blown over the wing 14.

Referring to FIGS. 6A-6C, the skin friction coefficient maps 170 were plotted and obtained for a baseline 172 comprising a known engine 90 with a known nacelle 94 in the known under-wing installation 92. As shown in FIGS. 6A-6C, the known under-wing installation 92 is coupled or attached to the wing 14, such as the first wing 14a, having the wing leading edge 15a and the wing trailing edge 15b, and the wing 14 is operatively coupled and extending from the fuselage 18. FIG. 6C shows the known engine 90 coupled to the wing 14 via the known pylon 100.

The computational fluid dynamics (CFD) simulations for the known under-wing installation 92 at the cruise configuration 70, shown in FIGS. 6A-6C, were carried out at a Mach number of 0.785, and a lift coefficient ($C_L$) of 0.55.

FIG. 6A is an illustration of a bottom plan view of a known under-wing installation cruise configuration lower surface skin friction coefficient map 170a. As shown in FIG. 6A, the known under-wing installation cruise configuration lower surface skin friction coefficient map 170a showed that the skin friction coefficient regions 174 on the lower surface 16 of the wing 14 directly behind the known engine 90 included the second skin friction coefficient region 174b and the third skin friction coefficient region 174c. Further, the known under-wing installation cruise configuration lower surface skin friction coefficient map 170a (see FIG. 6A) showed the first skin friction coefficient region 174a on a portion of the fuselage 18, and showed the fourth skin friction coefficient region 174d and the fifth skin friction coefficient region 174e on the known engine 90. As shown in FIG. 6A, although the fifth skin friction coefficient region 174e was present on the known engine 90, the fifth skin friction coefficient region 174e was not present on the lower surface 16 of the wing 14 behind the known engine 90. This indicated that there was no scrubbing or scrubbing drag 140 (see FIG. 4) by fan flow exhaust blown over the lower surface 16 of the wing 14 behind the known engine 90.

FIG. 6B is an illustration of a top plan view of a known under-wing installation cruise configuration upper surface skin friction coefficient map 170b. As shown in FIG. 6B, the known under-wing installation cruise configuration upper surface skin friction coefficient map 170b showed that the skin friction coefficient regions 174 on the upper surface 17 of the wing 14 directly behind the known engine 90 included the first skin friction coefficient region 174a, the second skin friction coefficient region 174b, the third skin friction coefficient region 174c, and the fourth skin friction coefficient region 174d. Further, the known under-wing installation cruise configuration upper surface skin friction coefficient map 170b (see FIG. 6B) showed the first skin friction coefficient region 174a on a portion of the known engine 90, and showed the fourth skin friction coefficient region 174d and the fifth skin friction coefficient region 174e on or near the wing leading edge 15a. As shown in FIG. 6B, although the fifth skin friction coefficient region 174e was present on or near the wing leading edge 15a, the fifth skin friction coefficient region 174e was not present on the upper surface 17 of the wing 14 behind the known engine 90. This indicated that there was no scrubbing or scrubbing drag 140 (see FIG. 4) by fan flow exhaust blown over the upper surface 17 of the wing 14 behind the known engine 90.

FIG. 6C is an illustration of a front perspective view of a known under-wing installation cruise configuration front upper surface skin friction coefficient map 170c. As shown in FIG. 6C, the known under-wing installation cruise configuration front upper surface skin friction coefficient map 170c showed that the skin friction coefficient regions 174 on the upper surface 17 of the wing 14 directly behind the known engine 90 included the first skin friction coefficient region 174a, the second skin friction coefficient region 174b, the third skin friction coefficient region 174c, and the fourth skin friction coefficient region 174d. Further, the known under-wing installation cruise configuration upper surface skin friction coefficient map 170b (see FIG. 6B) showed the fourth skin friction coefficient region 174d and the fifth skin friction coefficient region 174e on or near the wing leading edge 15a. As shown in FIG. 6C, although the fifth skin friction coefficient region 174e was present on or near the wing leading edge 15a, the fifth skin friction coefficient region 174e was not present on the upper surface 17 of the wing 14 behind the known engine 90. This indicated that there was no scrubbing or scrubbing drag 140 (see FIG. 4) by fan flow exhaust blown over the upper surface 17 of the wing 14 behind the known engine 90.

Referring to FIGS. 7A-7C, the skin friction coefficient maps 170 were plotted and obtained for the low-fan-pressure-ratio engine 10 disclosed herein, comprising the core 24 and the nacelle 26, such as the shortened nacelle 26a (see FIG. 7C), having the nacelle leading edge 27a and the nacelle trailing edge 27b. As shown in FIGS. 7A-7C, the nacelle 26 is positioned, in its entirety, at a forward location 52 in front of the wing leading edge 15a. As shown in FIG. 7C, the top-most portion 116 of the nacelle trailing edge 27b is positioned at a position 118 comprising a raised position 118a that is raised above the wing leading edge 15a, such as raised above the edge point of the wing leading edge 15a directly behind the nacelle trailing edge 27b. As shown in FIGS. 7A-7C, the low-fan-pressure-ratio engine 10 is in the forward over-wing-flow installation 50, and is coupled or attached to the wing 14, such as the first wing 14a, having the wing leading edge 15a and the wing trailing edge 15b, and the wing 14 is operatively coupled to and extending from the fuselage 18.

The computational fluid dynamics (CFD) simulations for the forward over-wing-flow installation 50 at the cruise configuration 70, shown in FIGS. 7A-7C, were carried out at a Mach number of 0.785, and a lift coefficient ($C_L$) of 0.55.

FIG. 7A is an illustration of a bottom plan view of a forward over-wing-flow (OWF) installation cruise configuration lower surface skin friction coefficient map 170d. FIG. 7A shows the fan flow exhaust 124, in the form of the fan flow exhaust plume 126, exhausted behind the nacelle 26 of the low-fan-pressure-ratio engine 10. As the fan flow exhaust 124 (see FIGS. 7A-7C) hits the wing leading edge 15a, the wing leading edge 15a bifurcates the fan flow exhaust 124, so that a first portion 124a (see FIGS. 7B, 7C) of the fan flow exhaust 124 flows over the upper surface 17 (see FIGS. 7B, 7C), such as an upper surface area 17b (see FIGS. 7B, 7C), of the wing 14, and a second portion 124b (see FIG. 7A) of the fan flow exhaust 124 flows over the lower surface 16 (see FIG. 7A), such as a lower surface area 16a (see FIGS. 7A), of the wing 14. As shown in FIG. 7A, the under-wing flow 134, such as the under-wing fan flow exhaust 134a, flows under and across the lower surface area 16a of the wing 14, and flows off or exits the wing 14 at the wing trailing edge 15b, behind the nacelle 26 of the low-fan-pressure-ratio engine 10.

As shown in FIG. 7A, the forward over-wing-flow installation cruise configuration lower surface skin friction coefficient map 170d showed that the skin friction coefficient regions 174 on the lower surface 16 of the wing 14, and in particular, on the lower surface area 16a, directly behind the nacelle 26 and the fan 42 (see FIGS. 1B, 4) shrouded by the nacelle 26, included the third skin friction coefficient region 174c, the fourth skin friction coefficient region 174d, and the fifth skin friction coefficient region 174e. In addition, the forward over-wing-flow installation cruise configuration lower surface skin friction coefficient map 170d (see FIG. 7A) showed the second skin friction coefficient region 174b on the second end 32 of the core 24.

Although the forward over-wing-flow installation cruise configuration lower surface skin friction coefficient map 170d (see FIG. 7A) showed the fifth skin friction coefficient region 174e on the lower surface area 16a directly behind the nacelle 26, the fifth skin friction coefficient region 174e was only present at the wing leading edge 15a directly behind the nacelle 26 and was not present on any other portions of the lower surface area 16a directly behind the nacelle 26 of the low-fan-pressure-ratio engine 10. This indicated that with the forward over-wing-flow (OWF) installation 50 (see FIG. 7A) at the cruise configuration 70 (see FIG. 7A), there was only minimal scrubbing or scrubbing drag 140 (see FIG. 4) by the fan flow 122 (see FIG. 4), such as the fan flow exhaust 124 (see FIG. 7A), at the wing leading edge 15a (see FIG. 7A) of the lower surface area 16a (see FIG. 7A), directly behind the nacelle 26 (see FIG. 7A).

FIG. 7B is an illustration of a top plan view of a forward over-wing-flow (OWF) installation cruise configuration upper surface skin friction coefficient map 170e. FIG. 7B shows the fan flow exhaust 124, in the form of the fan flow exhaust plume 126, exhausted behind the nacelle 26 of the low-fan-pressure-ratio engine 10, and shows the first portion 124a of the fan flow exhaust 124 bifurcated by the wing leading edge 15a, flowing over the upper surface 17, such as the upper surface area 17a, of the wing 14. As shown in FIG. 7B, the over-wing flow 132, such as the over-wing fan flow exhaust 132a flows over and across the upper surface area 17a of the wing 14, and flows off or exits the wing 14 at the wing trailing edge 15b, behind the nacelle 26 of the low-fan-pressure-ratio engine 10.

As shown in FIG. 7B, the forward over-wing-flow installation cruise configuration upper surface skin friction coefficient map 170e showed that the skin friction coefficient regions 174 on the upper surface 17 of the wing 14, and in particular, on the upper surface area 17a, directly behind the nacelle 26 and the fan 42 (see FIGS. 1B, 4) shrouded by the nacelle 26, included the second skin friction coefficient region 174b, the third skin friction coefficient region 174c, the fourth skin friction coefficient region 174d, and the fifth skin friction coefficient region 174e. Although the forward over-wing-flow installation cruise configuration upper surface skin friction coefficient map 170e (see FIG. 7B) showed the fifth skin friction coefficient region 174e on the upper surface area 17a directly behind the nacelle 26, the fifth skin friction coefficient region 174e was only present at the wing leading edge 15a directly behind the nacelle 26 and was not present on any other portions of the upper surface area 17a directly behind the nacelle 26 of the low-fan-pressure-ratio engine 10. This indicated that with the forward over-wing-flow (OWF) installation 50 (see FIG. 7B) at the cruise configuration 70 (see FIG. 7B), there was only minimal scrubbing or scrubbing drag 140 (see FIG. 4) by the fan flow 122 (see FIG. 4), such as the fan flow exhaust 124 (see FIG. 7B), at the wing leading edge 15a (see FIG. 7B) of the upper surface area 17a (see FIG. 7B), directly behind the nacelle 26 (see FIG. 7B).

FIG. 7C is an illustration of a front perspective view of a forward over-wing-flow (OWF) installation cruise configuration front upper surface skin friction coefficient map 170f. FIG. 7C shows the fan flow exhaust 124, in the form of the fan flow exhaust plume 126, exhausted behind the nacelle 26 of the low-fan-pressure-ratio engine 10, and shows the first portion 124a of the fan flow exhaust 124 bifurcated by the wing leading edge 15a, flowing over the upper surface 17, such as the upper surface area 17a, of the wing 14. As shown in FIG. 7C, the over-wing flow 132, such as the over-wing fan flow exhaust 132a flows over and across the upper surface area 17a of the wing 14, and flows off or exits the wing 14 at the wing trailing edge 15b, behind the nacelle 26 of the low-fan-pressure-ratio engine 10.

As shown in FIG. 7C, the forward over-wing-flow installation cruise configuration upper surface skin friction coefficient map 170f showed that the skin friction coefficient regions 174 on the upper surface 17 of the wing 14, and in particular, on the upper surface area 17a, directly behind the nacelle 26 and the fan 42, such as the variable pitch fan 42a, shrouded by the nacelle 26, included the second skin friction coefficient region 174b, the third skin friction coefficient region 174c, the fourth skin friction coefficient region 174d, and the fifth skin friction coefficient region 174d. Although the forward over-wing-flow installation cruise configuration upper surface skin friction coefficient map 170f (see FIG. 7C) showed the fifth skin friction coefficient region 174e on the upper surface area 17a directly behind the nacelle 26, the fifth skin friction coefficient region 174e was only present at the wing leading edge 15a directly behind the nacelle 26 and was not present on any other portions of the upper surface area 17a directly behind the nacelle 26 of the low-fan-pressure-ratio engine 10. This indicated that with the forward over-wing-flow (OWF) installation 50 (see FIG. 7C) at the cruise configuration 70 (see FIG. 7C), there was only minimal scrubbing or scrubbing drag 140 (see FIG. 4) by the fan flow 122 (see FIG. 4), such as the fan flow exhaust 124 (see FIG. 7C), at the wing leading edge 15a (see FIG. 7C) of the upper surface area 17a (see FIG. 7C), directly behind the nacelle 26 (see FIG. 7C).

Figure 8A:
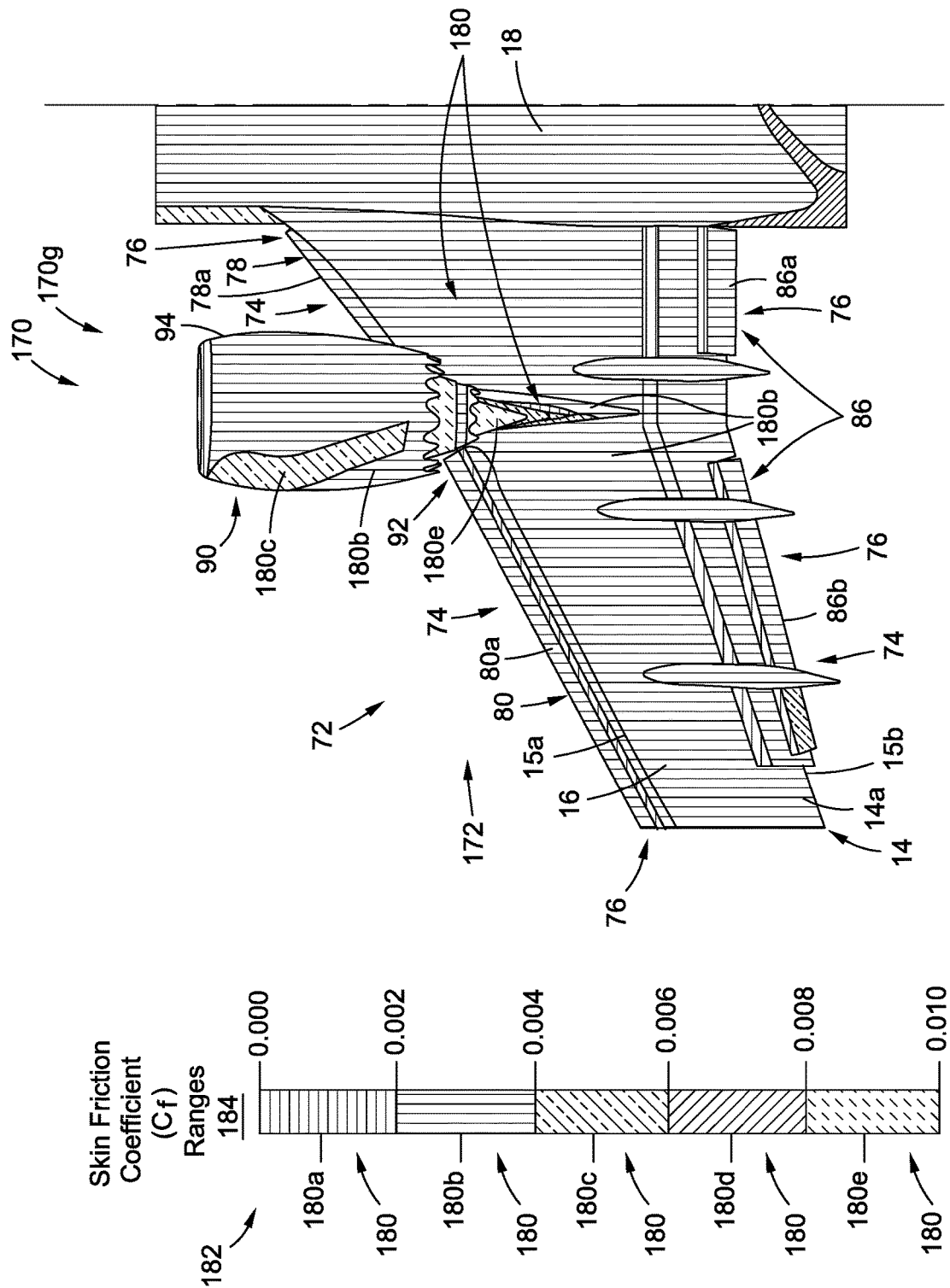
FIGS. 8A-8B are illustrations of skin friction coefficient maps of skin friction coefficient regions on a known under-wing installation in a high lift configuration.
Figure 8B:
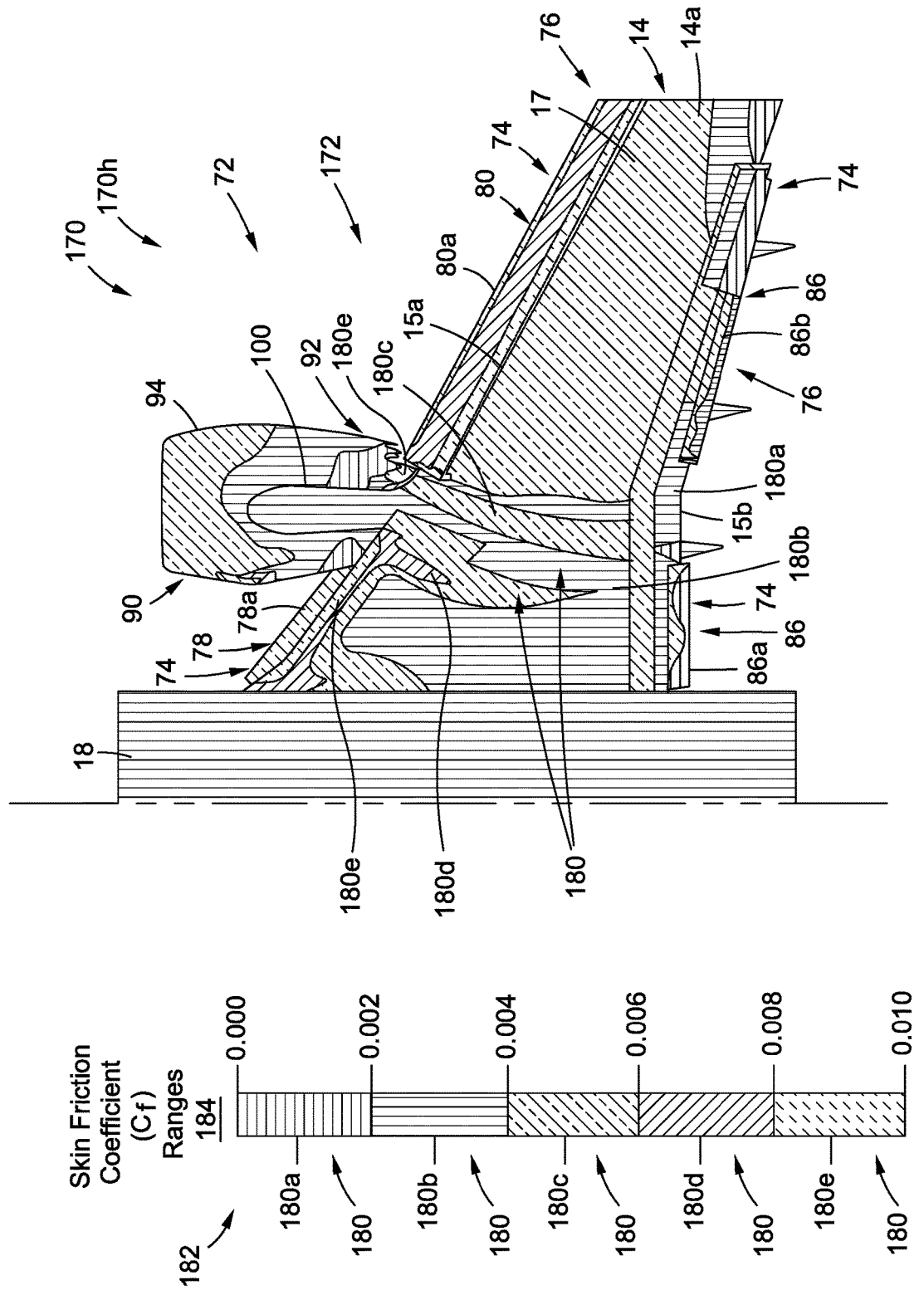
Figure 9A:
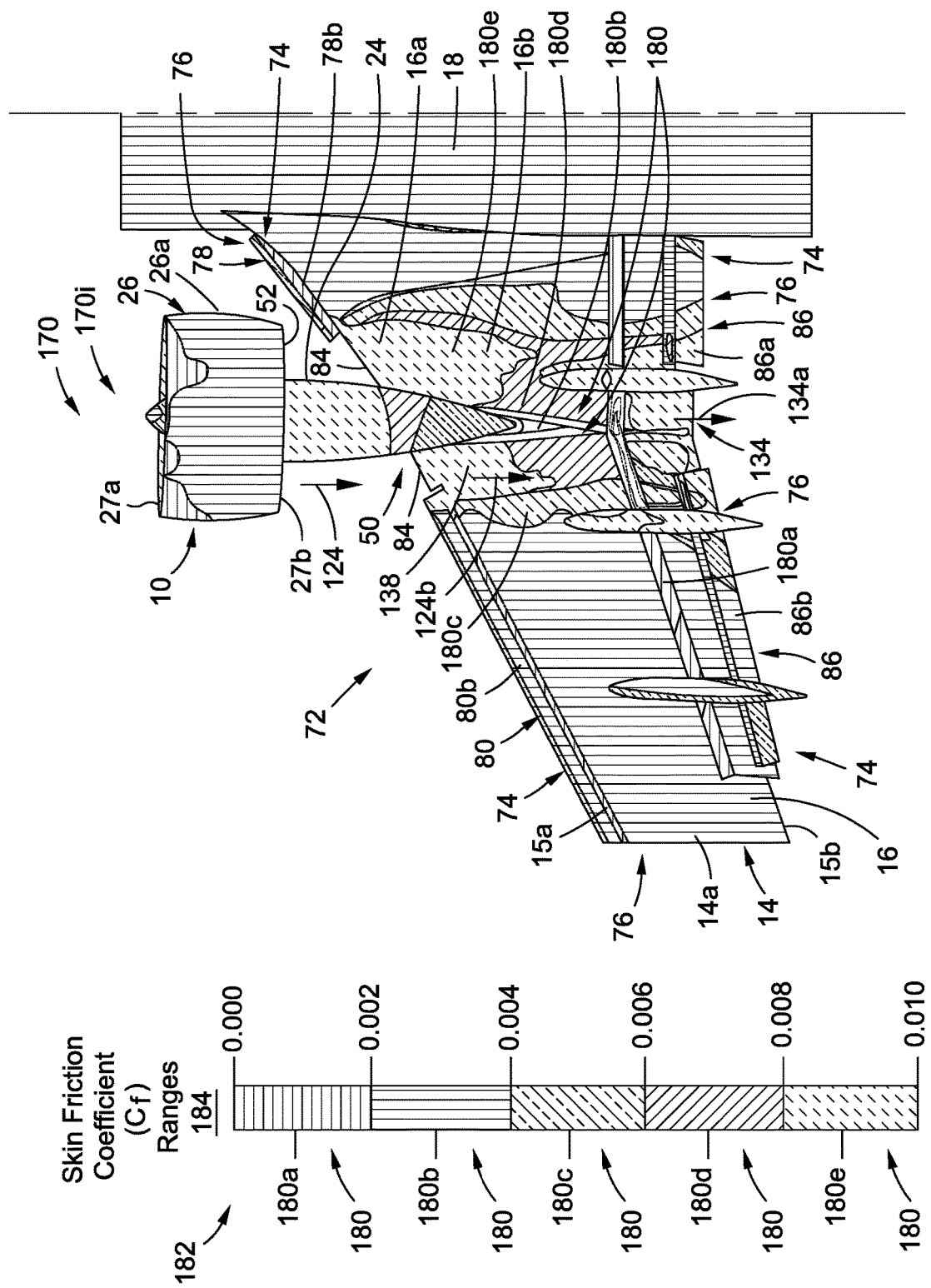
FIGS. 9A-9B are illustrations of skin friction coefficient maps of skin friction coefficient regions on a forward over-wing-flow installation of the disclosure in a high lift configuration.
Figure 9B:
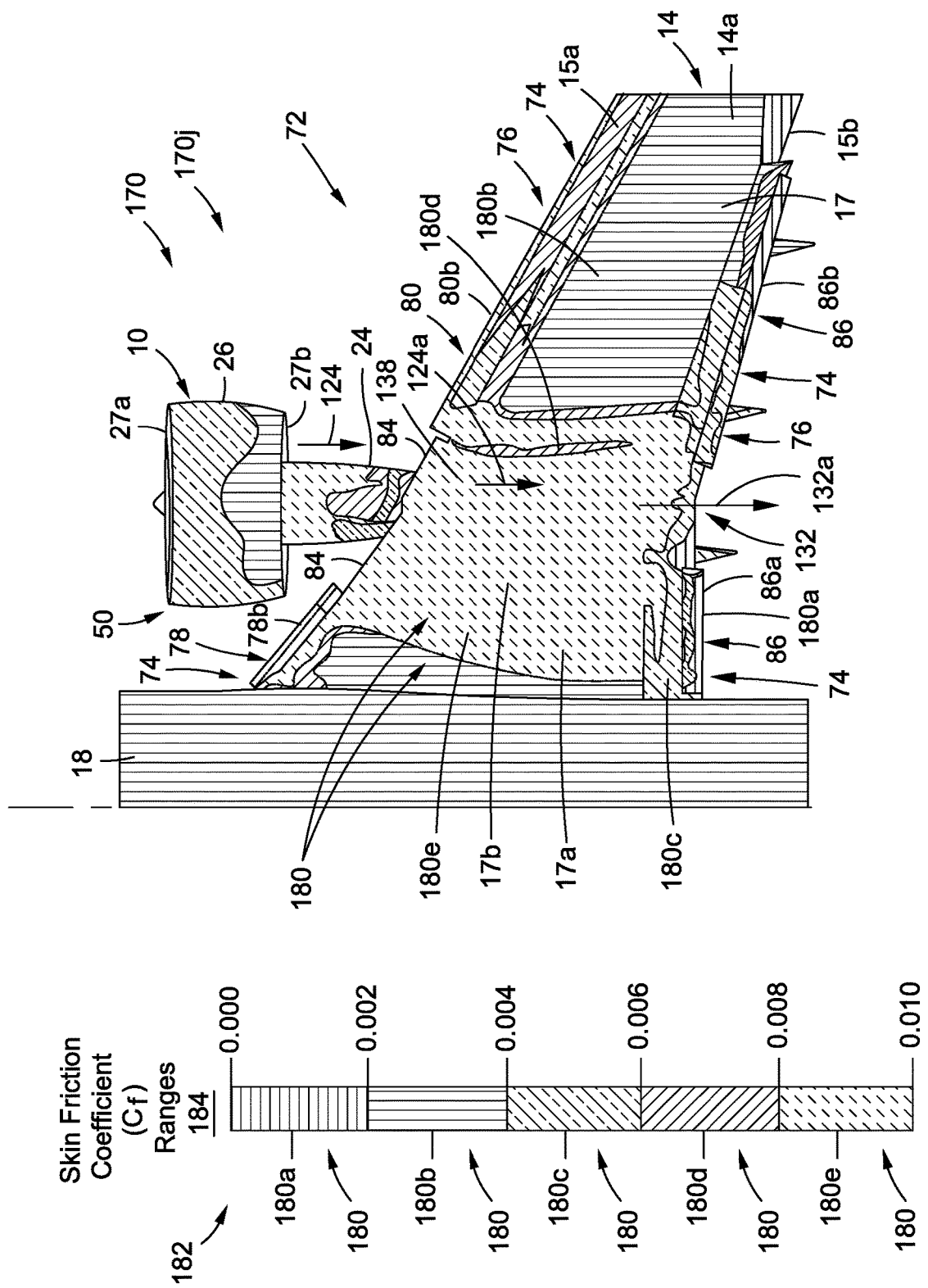

Now referring to FIGS. 8A-8B and 9A-9B, FIGS. 8A-8B are illustrations of skin friction coefficient maps 170 of various skin friction coefficient regions 180 on the known under-wing installation 92 in a high lift configuration 72, and FIGS. 9A-9B are illustrations of skin friction coefficient maps 170 of various skin friction coefficient regions 180 on a forward over-wing-flow (OWF) installation 50 of the disclosure, in a high lift configuration 72. The skin friction coefficient maps 170, as shown in FIGS. 8A-8B and FIGS. 9A-9B, were obtained using computational fluid dynamics (CFD) simulations and mapping the results. Skin friction coefficient ($C_f$) is also referred to as skin friction drag coefficient.

Referring to FIGS. 8A-8B and 9A-9B, FIGS. 8A-8B each show a legend 182 of skin friction coefficient regions 180 on the known under-wing installation 92 at various skin friction coefficient ($C_f$) ranges 184, and FIGS. 9A-9B each show the legend 182 of skin friction coefficient regions 180 on the forward over-wing-flow installation 50 at various skin friction coefficient ($C_f$) ranges 184. As shown in FIGS. 8A-8B and 9A-9B, the various skin friction coefficient ($C_f$) ranges 184 include a first skin friction coefficient region 180a corresponding to the skin friction coefficient ($C_f$) range 184 between 0.000 $C_f$ and 0.002 $C_f$; a second skin friction coefficient region 180b corresponding to the skin friction coefficient ($C_f$) range 184 between 0.002 $C_f$ and 0.004 $C_f$; a third skin friction coefficient region 180c corresponding to the skin friction coefficient ($C_f$) range 184 between 0.004 $C_f$ and 0.006 $C_f$; a fourth skin friction coefficient region 180d corresponding to the skin friction coefficient ($C_f$) range 184 between 0.006 $C_f$ and 0.008 $C_f$; and a fifth skin friction coefficient region 180e corresponding to the skin friction coefficient ($C_f$) range 184 between 0.008 $C_f$ and 0.010 $C_f$.

The first skin friction coefficient region 180a (see FIGS. 8A-8B, 9A-9B) corresponding to the skin friction coefficient ($C_f$) range 184 (see FIGS. 8A-8B, 9A-9B) between 0.000 $C_f$ and 0.002 $C_f$; indicated no or minimal scrubbing or scrubbing drag 140 (see FIG. 4) by the fan flow 122 (see FIG. 4), such as the fan flow exhaust 124 (see FIG. 4), blown over the wing 14 (see FIGS. 8A-8B, 9A-9B). In contrast, the fifth skin friction coefficient region 180e (see FIGS. 8A-8B, 9A-9B) corresponding to the skin friction coefficient ($C_f$) range 184 between 0.008 $C_f$ and 0.010 $C_f$ indicated scrubbing or scrubbing drag 140 (see FIG. 4) by the fan flow 122 (see FIG. 4), such as the fan flow exhaust 124 (see FIG. 4), blown over the wing 14.

Referring to FIGS. 8A-8B, the skin friction coefficient maps 170 were plotted and obtained for the baseline 172 comprising the known engine 90 with the known nacelle 94 in the known under-wing installation 92. As shown in FIGS. 8A-8B, the known under-wing installation 92 is coupled or attached to the wing 14, such as the first wing 14*a*, having the wing leading edge 15*a* and the wing trailing edge 15*b*, and the wing 14 is operatively coupled and extending from the fuselage 18. FIG. 8B shows the known engine 90 coupled to the wing 14 via the known pylon 100. As further shown in FIGS. 8A-8B, with the high lift configuration 72, the high lift devices 74 are in the deployed position 76 (see FIG. 8A). FIGS. 8A-8B show the leading edge flap 78, such as in the form of the inboard Krueger flap 78*a*, show the leading edge slat 80, such as in the form of outboard slat 80*a*, and show the trailing edge flaps 86, such as in the form of the inboard trailing edge flap 86*a* and the outboard trailing edge flap 86*b*.

The computational fluid dynamics (CFD) simulations for the known under-wing installation 92 at the high lift configuration 72, as shown in FIGS. 8A-8B, were carried out at a Mach number of 0.25, and an angle of attack (a) of 6° (six degrees).

FIG. 8A is an illustration of a bottom plan view of a known under-wing installation high lift configuration lower surface skin friction coefficient map 170*g*. As shown in FIG. 8A, the known under-wing installation high lift configuration lower surface skin friction coefficient map 170*g* showed that the skin friction coefficient regions 180 on the lower surface 16 of the wing 14 directly behind the known engine 90 included the second skin friction coefficient region 180*b*. Further, the known under-wing installation high lift configuration lower surface skin friction coefficient map 170*g* (see FIG. 8A) showed the second skin friction coefficient region 180*b* and the third skin friction coefficient region 180*c* on the known nacelle 94, and showed the fifth skin friction coefficient region 180*e* on the end of the known engine 90 behind the known nacelle 94. As shown in FIG. 8A, although the fifth skin friction coefficient region 180*e* was present on the known engine 90, the fifth skin friction coefficient region 180*e* was not present on the lower surface 16 of the wing 14 behind the known engine 90. This indicated that there was no scrubbing or scrubbing drag 140 (see FIG. 4) by fan flow exhaust blown over the lower surface 16 of the wing 14 behind the known engine 90.

FIG. 8B is an illustration of a top plan view of a known under-wing installation high lift configuration upper surface skin friction coefficient map 170*h*. As shown in FIG. 8B, the known under-wing installation high lift configuration upper surface skin friction coefficient map 170*h* showed that the skin friction coefficient regions 180 on the upper surface 17 of the wing 14 directly behind the known engine 90 included the first skin friction coefficient region 180*a*, the second skin friction coefficient region 180*b*, the third skin friction coefficient region 180*c*, and the fourth skin friction coefficient region 180*d*. Further, the known under-wing installation high lift configuration upper surface skin friction coefficient map 170*h* (see FIG. 8B) showed fifth skin friction coefficient regions 180*e* on a portion of the known engine 90, and on the wing leading edge 15*a*. As shown in FIG. 8B, although the fifth skin friction coefficient region 180*e* was present on the wing leading edge 15*a*, the fifth skin friction coefficient region 180*e* was not present on the upper surface 17 of the wing 14 behind the known engine 90. This indicated that there was no scrubbing or scrubbing drag 140 (see FIG. 4) by fan flow exhaust blown over the upper surface 17 of the wing 14 behind the known engine 90.

Referring to FIGS. 9A-9B, the skin friction coefficient maps 170 were plotted and obtained for the low-fan-pressure-ratio engine 10 disclosed herein, comprising the core 24 and the nacelle 26, such as the shortened nacelle 26*a*, having the nacelle leading edge 27*a* and the nacelle trailing edge 27*b*. As shown in FIG. 9A, the nacelle 26 is positioned, in its entirety, at a forward location 52 in front of the wing leading edge 15*a*. As shown in FIGS. 9A-9B, the low-fan-pressure-ratio engine 10 is in the forward over-wing-flow installation 50, and is coupled or attached to the wing 14, such as the first wing 14*a*, having the wing leading edge 15*a* and the wing trailing edge 15*b*, and the wing 14 is operatively coupled to and extending from the fuselage 18. As further shown in FIGS. 9A-9B, with the high lift configuration 72, the high lift devices 74 are in the deployed position 76. FIGS. 9A-9B show the leading edge flap 78, such as in the form of the trimmed inboard Krueger flap 78*b*, show the leading edge slat 80, such as in the form of trimmed outboard slat 80*b*, and show the trailing edge flaps 86, such as in the form of the inboard trailing edge flap 86*a* and the outboard trailing edge flap 86*b*. FIGS. 9A-9B further the show the trimmed leading edge 84 of the wing leading edge 15*a*, directly behind the nacelle trailing edge 27*b*.

The computational fluid dynamics (CFD) simulations for the forward over-wing-flow installation 50 at the high lift configuration 72, as shown in FIGS. 9A-9B, were carried out at a Mach number of 0.25, and an angle of attack (a) of 6° (six degrees).

FIG. 9A is an illustration of a bottom plan view of a forward over-wing-flow (OWF) installation high lift configuration lower surface skin friction coefficient map 170*i*. FIG. 9A shows the fan flow exhaust 124 exhausted behind the nacelle 26 of the low-fan-pressure-ratio engine 10. As the fan flow exhaust 124 (see FIGS. 9A-9B) hits the wing leading edge 15*a*, the wing leading edge 15*a* bifurcates the fan flow exhaust 124, so that the first portion 124*a* (see FIG. 9B) of the fan flow exhaust 124 flows over the upper surface 17 (see FIGS. 9B), such as the upper surface area 17*b* (see FIG. 9B), of the wing 14, and the second portion 124*b* (see FIG. 9A) of the fan flow exhaust 124 flows over the lower surface 16 (see FIG. 9A), such as the lower surface area 16*a* (see FIG. 9A), of the wing 14. As shown in FIG. 9A, the under-wing flow 134, such as the under-wing fan flow exhaust 134*a*, flows under and across the lower surface area 16*a* of the wing 14, to generate a lower surface blown area 16*b*, and flows off or exits the wing 14 at the wing trailing edge 15*b*, behind the nacelle 26 of the low-fan-pressure-ratio engine 10.

As shown in FIG. 9A, the forward over-wing-flow installation high lift configuration lower surface skin friction coefficient map 170*i* showed that the skin friction coefficient regions 180 on the lower surface 16, such as the lower surface area 16*a*, of the wing 14 directly behind the nacelle 26 and the fan 42 (see FIGS. 1B, 4) shrouded by the nacelle 26, included the first skin friction coefficient region 180*a*, the second skin friction coefficient region 180*b*, the third skin friction coefficient region 180*c*, the fourth skin friction coefficient region 180*d*, and the fifth skin friction coefficient region 180*e*. As shown in FIG. 9A, the fifth skin friction coefficient region 180*e* generated a scrubbed surface 138 on certain portions of the lower surface area 16*a* of the wing 14 behind the nacelle 26 of the low-fan-pressure-ratio engine 10.

FIG. 9B is an illustration of a top plan view of a forward over-wing-flow (OWF) installation high lift configuration upper surface skin friction coefficient map 170*j*. FIG. 9B shows the fan flow exhaust 124 exhausted behind the nacelle 26 of the low-fan-pressure-ratio engine 10. FIG. 9B shows the fan flow exhaust 124 exhausted behind the nacelle 26 of the low-fan-pressure-ratio engine 10, and shows the first portion 124*a* of the fan flow exhaust 124 bifurcated by the wing leading edge 15*a*, flowing over the upper surface 17, such as the upper surface area 17a, of the wing 14. As shown in FIG. 9B, the over-wing flow 132, such as the over-wing fan flow exhaust 132a flows over and across the upper surface area 17a of the wing 14, to generate an upper surface blown area 17b, and flows off or exits the wing 14 at the wing trailing edge 15b, behind the nacelle 26 of the low-fan-pressure-ratio engine 10.

As shown in FIG. 9B, the forward over-wing-flow (OWF) installation high lift configuration upper surface skin friction coefficient map 170j showed that the skin friction coefficient regions 180 on the upper surface 17, such as the upper surface area 17a, of the wing 14 directly behind the nacelle 26 and the fan 42 (see FIGS. 1B, 4) shrouded by the nacelle 26, included the first skin friction coefficient region 180a, the second skin friction coefficient region 180b, the third skin friction coefficient region 180c, the fourth skin friction coefficient region 180d, and the fifth skin friction coefficient region 180e. As shown in FIG. 9B, the fifth skin friction coefficient region 180e generated the scrubbed surface 138 on the upper surface area 17a of the wing 14 behind the nacelle 26 of the low-fan-pressure-ratio engine 10. However, it was found that with the high lift configuration 72 (see FIG. 9B), using a simplified flap architecture 87 (see FIG. 4) for the trailing edge flap 86 (see FIG. 9B), such as the inboard trailing edge flap 86a (see FIG. 9B), reduced or would reduce the scrubbing drag 140 (see FIG. 4) created by the fan flow exhaust 124 (see FIG. 9B) blown over the lower surface area 16a of the wing 14 behind the nacelle 26.

Figure 10:
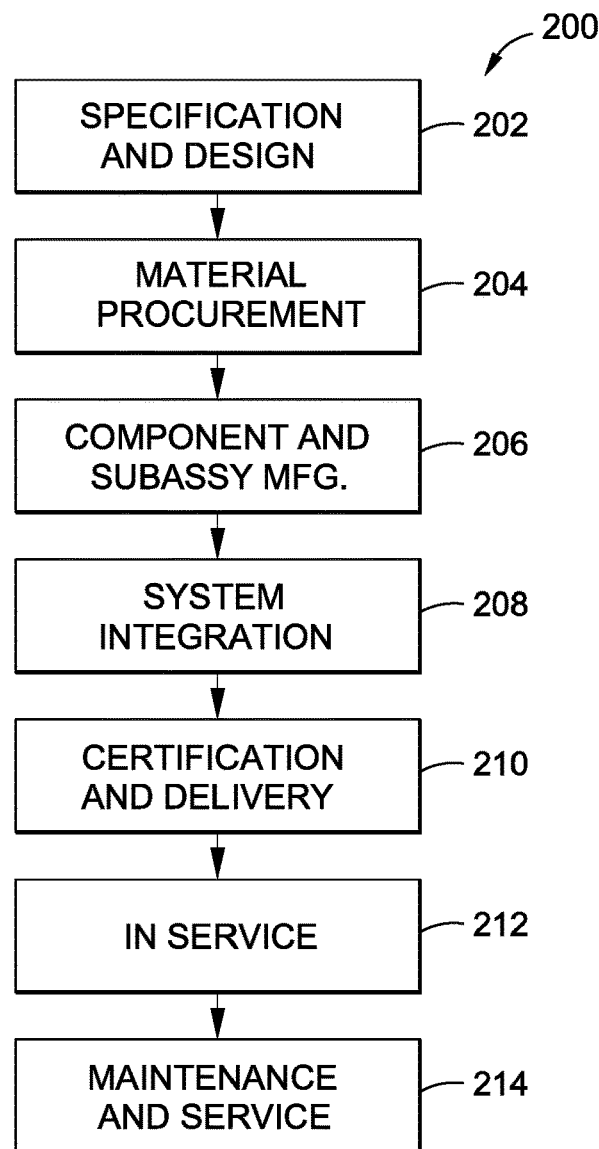
FIG. 10 is an illustration of a flow diagram of an aircraft manufacturing and service method.
Figure 11:
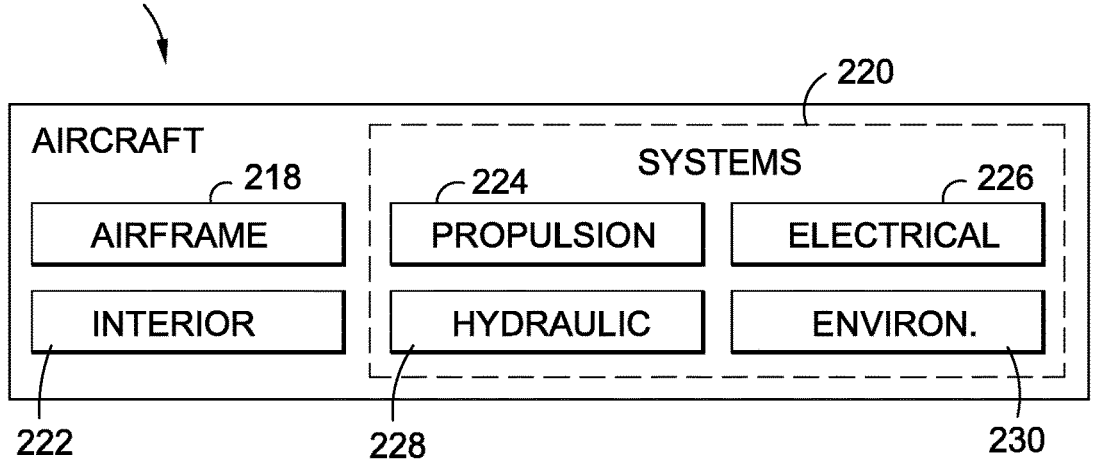
FIG. 11 is an illustration of a block diagram of an aircraft.

Now referring to FIGS. 10 and 11, FIG. 10 is an illustration of a flow diagram of an aircraft manufacturing and service method 200, and FIG. 11 is an illustration of a block diagram of an aircraft 216. Referring to FIGS. 10 and 11, versions of the disclosure may be described in the context of the aircraft manufacturing and service method 200 as shown in FIG. 10, and the aircraft 216 as shown in FIG. 11.

During pre-production, exemplary aircraft manufacturing and service method 200 may include specification and design 202 of the aircraft 216 and material procurement 204. During manufacturing, component and subassembly manufacturing 206 and system integration 208 of the aircraft 216 takes place. Thereafter, the aircraft 216 may go through certification and delivery 210 in order to be placed in service 212. While in service 212 by a customer, the aircraft 216 may be scheduled for routine maintenance and service 214 (which may also include modification, reconfiguration, refurbishment, and other suitable services).

Each of the processes of the aircraft manufacturing and service method 200 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 11, the aircraft 216 produced by the exemplary aircraft manufacturing and service method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

Methods and systems embodied herein may be employed during any one or more of the stages of the aircraft manufacturing and service method 200. For example, components or subassemblies corresponding to component and subassembly manufacturing 206 may be fabricated or manufactured in a manner similar to components or subassemblies produced while the aircraft 216 is in service 212. Also, one or more apparatus versions, method versions, or a combination thereof, may be utilized during component and subassembly manufacturing 206 and system integration 208, for example, by substantially expediting assembly of or reducing the cost of the aircraft 216. Similarly, one or more of apparatus versions, method versions, or a combination thereof, may be utilized while the aircraft 316 is in service 212, for example and without limitation, to maintenance and service 214.

Disclosed versions of the propulsion system 11 (see FIGS. 1A, 4) with the low-fan-pressure-ratio engine 10 (see FIGS. 1A-1E, 4) for an aircraft 12 (see FIGS. 1A, 4), and the method 160 (see FIG. 5) for installing the same provide a solution to install a low-fan-pressure-ratio engine 10, such as a very-high-bypass-ratio engine 10c (see FIG. 4) with a large diameter fan 42b (see FIGS. 1B, 4), e.g., 80-135 inch fan diameter, that is highly efficient, on a class of aircraft 12 that requires about 30,000 pounds of sea-level static thrust at takeoff, without the need for much longer and heavier landing gear assembly(ies) 19 (see FIGS. 1A, 4), for example, having to add significant length to an existing or known landing-gear length. The forward over-wing-flow installation 50 (see FIGS. 3, 4) of the low-fan-pressure-ratio engine 10 does not require changing, or substantially changing, the length 19a (see FIG. 4), or the weight 19b (see FIG. 4), or the structure, of the landing gear assembly(ies) 19 (see FIGS. 1A, 4), including the landing gear and the landing gear structure, on existing or known aircraft, or on new aircraft. The forward over-wing-flow installation 50 (see FIGS. 3, 4) of the low-fan-pressure-ratio engine 10 provides for the integration of a highly efficient turbofan engine into existing aircraft, for example, existing narrow body aircraft, and into new aircraft, and a lighter weight solution, a less costly to manufacture solution, and avoids raising a fuselage door height to a height that existing or known jet-ways may not be able to accommodate the aircraft.

Moreover, disclosed versions of the propulsion system 11 (see FIGS. 1A, 4) with the low-fan-pressure-ratio engine 10 (see FIGS. 1A-1E, 4) for an aircraft 12 (see FIGS. 1A, 4), and the method 160 (see FIG. 5) for installing the same provide for the forward over-wing-flow installation 50 (see FIGS. 3, 4) of a low-fan-pressure-ratio engine 10 with an extremely low fan pressure ratio 36 (see FIG. 4), e.g., 1.10 to 1.30, and enables, during all flight phases 150 (see FIG. 4) of the aircraft 12, a fan flow exhaust 124 (see FIG. 4), exhausted by the variable pitch fan 42a, to flow behind the nacelle 26, and to be bifurcated by the wing leading edge 15a, so the fan flow exhaust 124 flows both over the wing 14 and under the wing 14 and provides a bifurcated fan flow 130 (see FIG. 4), such as a bifurcated fan flow exhaust 130a (see FIG. 4). Further, the forward over-wing-flow installation 50 (see FIGS. 3, 4) of the low-fan-pressure-ratio engine 10 enables, during the cruise flight phase 150a (see FIG. 4) of the aircraft 12, the low-fan-pressure-ratio engine 10 to minimize scrubbing drag 140 (see FIG. 4) of the fan flow exhaust 124 (see FIG. 4) to the wing 14. Further, the forward over-wing-flow installation 50 (see FIGS. 3, 4) of the low-fan-pressure-ratio engine 10 uses the fan flow exhaust 124 (see FIG. 4) during the high lift configuration 72 (see FIG. 2) of the aircraft 12, to assist in lift 144 (see FIG. 4) during the takeoff flight phase 150b (see FIG. 4) and during the landing flight phase 150c (see FIG. 4), and provides the cruise configuration 70 (see FIG. 4) where the fan flow exhaust 124 (see FIG. 4) only minimally affects the lift 144 (see FIG. 4) during the cruise flight phase 150a (see FIG. 4).

In addition, disclosed versions of the propulsion system 11 (see FIGS. 1A, 4) with the low-fan-pressure-ratio engine 10 (see FIGS. 1A-1E, 4) for an aircraft 12 (see FIGS. 1A, 4), and the method 160 (see FIG. 5) for installing the same provide for a modified high lift system 73a (see FIGS. 3, 4) having trimmed leading edge devices 74d (see FIGS. 1E, 3) that provide a trimmed leading edge 84 (see FIG. 1E) with a total trimmed length 82 (see FIG. 1E) directly behind the nacelle trailing edge 27b (see FIG. 1E) that helps to reduce the scrubbing drag 140 (see FIG. 4) over the upper surface 17 (see FIG. 3) of the wing 14 and over the leading edge flaps 78 (see FIG. 1E), the leading edge slats 80 (see FIG. 1E), and the trailing edge flaps 86 (see FIG. 1E), located behind the nacelle 26 (see FIG. 3) of the low-fan-pressure-ratio engine 10 (see FIGS. 1E, 3). Moreover, the modified high lift system 73a (see FIGS. 3, 4) provides for one or more trailing edge flaps 86 (see FIG. 1E), such as the inboard trailing edge flap 86a (see FIG. 1E), having a limited angular motion 88 (see FIG. 4) and a simplified flap architecture 87 (see FIG. 4), for example, using one or more inboard trailing edge flaps 86a comprising a simple hinge flap 86c (see FIG. 4), a plain flap 86d (see FIG. 4), a single part flap 86e (see FIG. 4), or another suitable flap with a simplified flap architecture 87.

Many modifications and other versions or embodiments of the disclosure will come to mind to one skilled in the art to which this disclosure pertains having the benefit of the teachings presented in the foregoing descriptions and the associated drawings. The versions or embodiments described herein are meant to be illustrative and are not intended to be limiting or exhaustive. Although specific terms are employed herein, they are used in a generic and descriptive sense only and not for purposes of limitation.

What is claimed is:

1. A propulsion system for an aircraft, comprising:
  a low-fan-pressure-ratio engine configured to be mounted, in a forward over-wing-flow installation, to a wing of the aircraft, the low-fan-pressure-ratio engine comprising:
    a core having a first end and a second end;
    a variable pitch fan coupled to the first end of the core;
    a nacelle surrounding the variable pitch fan and a portion of the core, the nacelle having a nacelle leading edge and a nacelle trailing edge, the nacelle trailing edge having a top-most portion configured to be positioned above a wing leading edge of the wing, and the nacelle configured to be positioned, in its entirety, at a forward location in front of the wing leading edge;
    a length to diameter (L/D) ratio of the nacelle in a range of from 0.6 to 1.0; and
    a fan-pressure-ratio in a range of from 1.10 to 1.30,
  wherein the forward over-wing-flow installation of the low-fan-pressure-ratio engine of the propulsion system enables, during all flight phases of the aircraft, a fan flow exhaust, exhausted by the variable pitch fan, to flow behind the nacelle, and to be bifurcated by the wing leading edge, so the fan flow exhaust flows both over the wing and under the wing, and further wherein during a cruise flight phase of the aircraft, the low-fan-pressure-ratio engine minimizes scrubbing drag of the fan flow exhaust to the wing.

2. The propulsion system of claim 1, wherein the low-fan-pressure-ratio engine comprises a very-high-bypass-ratio engine having a bypass ratio in a range of from 15 to 50.

3. The propulsion system of claim 1, wherein the top-most portion of the nacelle trailing edge is configured to be positioned at a position comprising a raised position raised above the wing leading edge.

4. The propulsion system of claim 1, wherein the fan flow exhaust, exhausted by the variable pitch fan behind the nacelle, assists in lift of the aircraft during a takeoff flight phase of the aircraft, and during a landing flight phase of the aircraft.

5. The propulsion system of claim 1, wherein the fan flow exhaust, exhausted by the variable pitch fan behind the nacelle, minimally affects lift of the aircraft during the cruise flight phase of the aircraft.

6. An aircraft comprising:
  a fuselage;
  at least one wing operatively coupled to the fuselage, the at least one wing having a wing leading edge and a wing trailing edge; and
  a propulsion system operatively coupled to the at least one wing, the propulsion system comprising:
    a low-fan-pressure-ratio engine coupled to the at least one wing, in a forward over-wing-flow installation, the low-fan-pressure-ratio engine comprising:
      a core having a first end and a second end;
      a variable pitch fan coupled to the first end of the core;
      a nacelle surrounding the variable pitch fan and a portion of the core, the nacelle having a nacelle leading edge and a nacelle trailing edge, the nacelle trailing edge having a top-most portion positioned above the wing leading edge, and the nacelle configured to be positioned, in its entirety, at a forward location in front of the wing leading edge;
      a length to diameter (L/D) ratio of the nacelle in a range of from 0.6 to 1.0; and
      a fan-pressure-ratio in a range of from 1.10 to 1.30,
    wherein the forward over-wing-flow installation of the low-fan-pressure-ratio engine of the propulsion system enables, during all flight phases of the aircraft, a fan flow exhaust, exhausted by the variable pitch fan, to flow behind the nacelle, and to be bifurcated by the wing leading edge, so the fan flow exhaust flows both over the at least one wing and under the at least one wing, and further wherein during a cruise flight phase of the aircraft, the low-fan-pressure-ratio engine minimizes scrubbing drag of the fan flow exhaust to the wing.

7. The aircraft of claim 6, further comprising a modified high lift system operatively coupled to the at least one wing, the modified high lift system comprising one or more high lift devices operatively coupled to the wing leading edge and to the wing trailing edge, the one or more high lift devices comprising:
  one or more trimmed leading edge devices, each having one or more trimmed portions, the one or more trimmed leading edge devices positioned directly behind the nacelle, and the one or more trimmed portions having a total trimmed length substantially corresponding to a length of a fan diameter of the variable pitch fan; and
  one or more trailing edge flaps positioned behind the one or more trimmed leading edge devices, the one or more trailing edge flaps having a limited angular motion and a simplified flap architecture.

8. The aircraft of claim 7, wherein the one or more trimmed leading edge devices comprise a trimmed inboard Krueger flap and a trimmed outboard slat.

9. The aircraft of claim 7, wherein the total trimmed length comprises at least 80% (eighty percent) of a length of the wing leading edge positioned directly behind the nacelle.

10. The aircraft of claim 7, wherein the one or more trailing edge flaps comprise one or more of, an inboard trailing edge flap, an outboard trailing edge flap, a simple hinge flap, a plain flap, and a single part flap.

11. The aircraft of claim 6, wherein the low-fan-pressure-ratio engine comprises a very-high-bypass-ratio engine having a bypass ratio in a range of from 15 to 50.

12. The aircraft of claim 6, wherein the top-most portion of the nacelle trailing edge is positioned at a position comprising a raised position raised above the wing leading edge.

13. The aircraft of claim 6, wherein the fan flow exhaust, exhausted by the variable pitch fan behind the nacelle, assists in lift of the aircraft during a takeoff flight phase of the aircraft, and during a landing flight phase of the aircraft.

14. The aircraft of claim 6, wherein the fan flow exhaust, exhausted by the variable pitch fan behind the nacelle, minimally affects lift of the aircraft during the cruise flight phase of the aircraft.

15. The aircraft of claim 6, wherein the forward over-wing-flow installation of the low-fan-pressure-ratio engine does not require changing a length, or a weight, of a landing gear assembly of the aircraft.

16. A method of installing a low-fan-pressure-ratio engine in a forward over-wing-flow installation on an aircraft, the method comprising:
   providing the aircraft comprising:
      a fuselage; and
      at least one wing operatively coupled to the fuselage, the at least one wing having a wing leading edge and a wing trailing edge; and
   installing the low-fan-pressure-ratio engine in the forward over-wing-flow installation on the aircraft, the low-fan-pressure-ratio engine comprising:
      a core having a first end and a second end;
      a variable pitch fan coupled to the first end of the core;
      a nacelle surrounding the variable pitch fan and a portion of the core, the nacelle having a nacelle leading edge and a nacelle trailing edge;
      a length to diameter (L/D) ratio of the nacelle in a range of from 0.6 to 1.0; and
      a fan-pressure-ratio in a range of from 1.10 to 1.30,
   the installing the low-fan-pressure-ratio engine in the forward over-wing-flow installation comprising:
      positioning the nacelle, in its entirety, at a forward location in front of the wing leading edge;
      positioning a top-most portion of the nacelle trailing edge above the wing leading edge;
      coupling the core to the at least one wing, via an engine mount structure; and
      enabling, during all flight phases of the aircraft, a fan flow exhaust, exhausted by the variable pitch fan, to flow behind the nacelle, and to be bifurcated by the wing leading edge, so the fan flow exhaust flows both over the at least one wing and under the at least one wing.

17. The method of claim 16, wherein providing the aircraft further comprises providing the aircraft having a modified high lift system operatively coupled to the at least one wing, the modified high lift system comprising one or more high lift devices operatively coupled to the wing leading edge and to the wing trailing edge, the one or more high lift devices comprising:
   one or more trimmed leading edge devices, each having one or more trimmed portions, the one or more trimmed leading edge devices positioned directly behind the nacelle, and the one or more trimmed portions having a total trimmed length substantially corresponding to a length of a fan diameter of the variable pitch fan; and
   one or more trailing edge flaps positioned behind the one or more trimmed leading edge devices, the one or more trailing edge flaps having a limited angular motion and a simplified flap architecture.

18. The method of claim 16, wherein providing the aircraft further comprises providing the aircraft having a landing gear assembly, and further wherein installing the low-fan-pressure-ratio engine in the forward over-wing-flow installation does not require changing a length, or a weight, of the landing gear assembly.

19. The method of claim 16, wherein installing the low-fan-pressure-ratio engine in the forward over-wing-flow installation further enables, during a cruise flight phase of the aircraft, the low-fan-pressure-ratio engine to minimize scrubbing drag of the fan flow exhaust to the wing.

20. The method of claim 16, wherein positioning the top-most portion of the nacelle trailing edge above the wing leading edge comprises positioning the top-most portion of the nacelle trailing edge at a position comprising a raised position raised above the wing leading edge.

* * * * *